(12) United States Patent
Watson et al.

(10) Patent No.: US 8,676,632 B1
(45) Date of Patent: Mar. 18, 2014

(54) PRICING AND FORECASTING

(75) Inventors: Angela Watson, Draper, UT (US); Rebecca Richardson, Holladay, UT (US); Anshu Jalora, Salt Lake City, UT (US); Wendy Liu, San Diego, CA (US); Ryan Hofmann, Sandy, UT (US)

(73) Assignee: Overstock.com, Inc., Salt Lake City, UT (US)

( * ) Notice: Subject to any disclaimer, the term of this patent is extended or adjusted under 35 U.S.C. 154(b) by 700 days.

(21) Appl. No.: 12/504,550

(22) Filed: Jul. 16, 2009

(51) Int. Cl.
*G06Q 10/00* (2012.01)
*G06F 17/00* (2006.01)

(52) U.S. Cl.
USPC .................... 705/7.35; 705/400; 705/1.1

(58) Field of Classification Search
USPC ................... 705/1.1, 7.35, 400, 7.11
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,412,287 A | 10/1983 | Braddock, III | |
| 4,674,044 A | 6/1987 | Kalmus et al. | |
| 4,677,552 A | 6/1987 | Sibley, Jr. | |
| 4,789,928 A | 12/1988 | Fujisaki | |
| 4,799,156 A | 1/1989 | Shavit et al. | |
| 4,808,987 A | 2/1989 | Takeda et al. | |
| 4,823,265 A | 4/1989 | Nelson | |
| 4,854,516 A | 8/1989 | Yamada | |
| 4,903,201 A | 2/1990 | Wagner | |
| RE33,316 E | 8/1990 | Katsuta et al. | |
| 5,027,110 A | 6/1991 | Chang et al. | |
| 5,053,956 A | 10/1991 | Donald et al. | |
| 5,063,507 A | 11/1991 | Lindsey et al. | |
| 5,077,665 A | 12/1991 | Silverman et al. | |
| 5,101,353 A | 3/1992 | Lupien et al. | |
| 5,136,501 A | 8/1992 | Silverman et al. | |
| 5,168,446 A | 12/1992 | Wiseman | |
| 5,205,200 A | 4/1993 | Wright | |
| 5,243,515 A | 9/1993 | Lee | |
| 5,258,908 A | 11/1993 | Hartheimer et al. | |
| 5,280,422 A | 1/1994 | Moe et al. | |

(Continued)

FOREIGN PATENT DOCUMENTS

| CA | 2253543 | 10/1997 |
|---|---|---|
| CA | 2347812 | 5/2000 |

(Continued)

OTHER PUBLICATIONS

Business/Technology Editors. "Sellers Flock to OutletZoo.com as a New Automatic Price Drop Method moves Excess Inventory Online." Oct. 24, 1999, Business Wire [New York], p. 1.*
Sen, Alper. "Inventory and Pricing Models for Perishable Products." Aug. 2000, (Order No. 3018124, University of Southern California). ProQuest Dissertations and Theses, pp. 221-221.*

(Continued)

*Primary Examiner* — Michael Harrington
(74) *Attorney, Agent, or Firm* — Clayton, Howarth & Cannon, P.C.

(57) ABSTRACT

The pricing of a product is programmatically defined as a solution to a price optimization equation that includes an in-date constraint and an out-date constraint. The in-date constraint may require that the price established by the price optimization equation be predicted not to exhaust an inventory of the product during a first time interval. The out-date constraint may require that the same price established by the price optimization equation be predicted to exhaust an inventory of the product by the end of a second time interval.

5 Claims, 18 Drawing Sheets

(56) References Cited

U.S. PATENT DOCUMENTS

| | | |
|---|---|---|
| 5,297,031 A | 3/1994 | Gutterman et al. |
| 5,297,032 A | 3/1994 | Trojan et al. |
| 5,301,350 A | 4/1994 | Rogan et al. |
| 5,305,200 A | 4/1994 | Hartheimer et al. |
| 5,325,297 A | 6/1994 | Bird et al. |
| 5,329,589 A | 7/1994 | Fraser et al. |
| 5,347,632 A | 9/1994 | Filepp et al. |
| 5,375,055 A | 12/1994 | Togher et al. |
| 5,394,324 A | 2/1995 | Clearwater |
| 5,407,433 A | 4/1995 | Loomas |
| 5,411,483 A | 5/1995 | Loomas et al. |
| 5,426,281 A | 6/1995 | Abecassis |
| 5,485,510 A | 1/1996 | Colbert |
| 5,493,677 A | 2/1996 | Balogh et al. |
| 5,553,145 A | 9/1996 | Micali |
| 5,557,728 A | 9/1996 | Garrett et al. |
| 5,579,471 A | 11/1996 | Barber et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,111 A | 9/1997 | Nahan et al. |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,721,908 A | 2/1998 | Lagarde et al. |
| 5,722,418 A | 3/1998 | Bro |
| 5,727,165 A | 3/1998 | Ordish et al. |
| 5,737,599 A | 4/1998 | Rowe et al. |
| 5,760,917 A | 6/1998 | Sheridan |
| 5,761,496 A | 6/1998 | Hattori |
| 5,761,655 A | 6/1998 | Hoffman |
| 5,761,662 A | 6/1998 | Dasan |
| 5,771,291 A | 6/1998 | Newton et al. |
| 5,771,380 A | 6/1998 | Tanaka et al. |
| 5,778,367 A | 7/1998 | Wesinger, Jr. et al. |
| 5,790,790 A | 8/1998 | Smith et al. |
| 5,794,216 A | 8/1998 | Brown |
| 5,794,219 A | 8/1998 | Brown |
| 5,796,395 A | 8/1998 | de Hond |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,870,754 A | 2/1999 | Dimitrova et al. |
| 5,872,848 A | 2/1999 | Romney et al. |
| 5,873,069 A | 2/1999 | Reuhl et al. |
| 5,873,080 A | 2/1999 | Coden et al. |
| 5,884,056 A | 3/1999 | Steele |
| 5,890,138 A | 3/1999 | Godin et al. |
| 5,890,175 A | 3/1999 | Wong et al. |
| 5,905,975 A | 5/1999 | Ausubel |
| 5,907,547 A | 5/1999 | Foladare et al. |
| 5,913,215 A | 6/1999 | Rubinstein et al. |
| 5,922,074 A | 7/1999 | Richard et al. |
| 5,924,072 A | 7/1999 | Havens |
| 5,926,794 A | 7/1999 | Fethe |
| 5,948,040 A | 9/1999 | DeLorme et al. |
| 5,948,061 A | 9/1999 | Merriman et al. |
| 5,974,412 A | 10/1999 | Hazlehurst et al. |
| 5,986,662 A | 11/1999 | Argiro et al. |
| 5,987,446 A | 11/1999 | Corey et al. |
| 5,991,739 A | 11/1999 | Cupps et al. |
| 5,999,915 A | 12/1999 | Nahan et al. |
| 6,012,053 A | 1/2000 | Pant et al. |
| 6,029,141 A | 2/2000 | Bezos et al. |
| 6,035,288 A | 3/2000 | Solomon |
| 6,035,402 A | 3/2000 | Vaeth et al. |
| 6,044,363 A | 3/2000 | Mori et al. |
| 6,045,447 A | 4/2000 | Yoshizawa et al. |
| 6,047,264 A | 4/2000 | Fisher et al. |
| 6,055,518 A | 4/2000 | Franklin et al. |
| 6,058,379 A | 5/2000 | Odom et al. |
| 6,058,417 A | 5/2000 | Hess et al. |
| 6,058,428 A | 5/2000 | Wang et al. |
| 6,061,448 A | 5/2000 | Smith et al. |
| 6,065,041 A | 5/2000 | Lum et al. |
| 6,070,125 A | 5/2000 | Murphy et al. |
| 6,073,117 A | 6/2000 | Oyanagi et al. |
| 6,078,914 A | 6/2000 | Redfern |
| 6,085,176 A | 7/2000 | Woolston |
| 6,104,815 A | 8/2000 | Alcorn et al. |
| 6,119,137 A | 9/2000 | Smith et al. |
| 6,128,649 A | 10/2000 | Smith et al. |
| 6,141,010 A | 10/2000 | Hoyle |
| 6,167,382 A | 12/2000 | Sparks et al. |
| 6,178,408 B1 | 1/2001 | Copple et al. |
| 6,185,558 B1 | 2/2001 | Bowman et al. |
| 6,192,407 B1 | 2/2001 | Smith et al. |
| 6,199,077 B1 | 3/2001 | Inala et al. |
| 6,202,051 B1 | 3/2001 | Woolston |
| 6,202,061 B1 | 3/2001 | Khosla et al. |
| 6,226,412 B1 | 5/2001 | Schwab |
| 6,243,691 B1 | 6/2001 | Fisher et al. |
| 6,269,238 B1 | 7/2001 | Iggulden |
| 6,271,840 B1 | 8/2001 | Finseth et al. |
| 6,275,820 B1 | 8/2001 | Navin-Chandra et al. |
| 6,275,829 B1 | 8/2001 | Angiulo et al. |
| 6,356,879 B2 | 3/2002 | Aggarwal et al. |
| 6,356,908 B1 | 3/2002 | Brown et al. |
| 6,366,899 B1 | 4/2002 | Kernz |
| 6,370,527 B1 | 4/2002 | Singhal |
| 6,373,933 B1 | 4/2002 | Sarkki et al. |
| 6,374,260 B1 | 4/2002 | Hoffert et al. |
| 6,381,510 B1 | 4/2002 | Amidhozour et al. |
| 6,415,320 B1 | 7/2002 | Hess et al. |
| 6,434,556 B1 | 8/2002 | Levin et al. |
| 6,456,307 B1 | 9/2002 | Bates et al. |
| 6,460,020 B1 | 10/2002 | Pool et al. |
| 6,466,917 B1 | 10/2002 | Goyal et al. |
| 6,484,149 B1 | 11/2002 | Jammes et al. |
| 6,489,968 B1 | 12/2002 | Ortega et al. |
| 6,523,037 B1 | 2/2003 | Monahan et al. |
| 6,601,061 B1 | 7/2003 | Holt et al. |
| 6,604,107 B1 | 8/2003 | Wang |
| 6,643,696 B2 | 11/2003 | Davis et al. |
| 6,665,838 B1 | 12/2003 | Brown et al. |
| 6,701,310 B1 | 3/2004 | Sugiura et al. |
| 6,728,704 B2 | 4/2004 | Mao et al. |
| 6,732,161 B1 | 5/2004 | Hess et al. |
| 6,732,162 B1 | 5/2004 | Wood et al. |
| 6,856,963 B1 | 2/2005 | Hurwitz |
| 6,889,054 B2 | 5/2005 | Himmel et al. |
| 7,076,453 B2 | 7/2006 | Jammes et al. |
| 7,100,111 B2 | 8/2006 | McElfresh et al. |
| 7,117,207 B1 | 10/2006 | Kerschberg et al. |
| 7,127,416 B1 | 10/2006 | Tenorio |
| 7,165,091 B2 | 1/2007 | Lunenfeld |
| 7,167,910 B2 | 1/2007 | Farnham et al. |
| 7,216,115 B1 | 5/2007 | Walters et al. |
| 7,340,249 B2 | 3/2008 | Moran et al. |
| 7,349,668 B2 | 3/2008 | Ilan et al. |
| 7,379,890 B2 * | 5/2008 | Myr et al. .................... 705/7.35 |
| 7,380,217 B2 | 5/2008 | Gvelesiani |
| 7,454,464 B2 | 11/2008 | Puthenkulam et al. |
| 7,496,582 B2 | 2/2009 | Farnham et al. |
| 7,653,573 B2 | 1/2010 | Hayes, Jr. et al. |
| 7,912,748 B1 * | 3/2011 | Rosenberg et al. .......... 705/7.35 |
| 8,112,303 B2 * | 2/2012 | Eglen et al. .................. 705/7.35 |
| 2001/0034667 A1 | 10/2001 | Petersen |
| 2001/0034668 A1 | 10/2001 | Whitworth |
| 2001/0044751 A1 | 11/2001 | Pugliese et al. |
| 2001/0047290 A1 | 11/2001 | Petras et al. |
| 2001/0051996 A1 | 12/2001 | Cooper et al. |
| 2002/0002513 A1 | 1/2002 | Chiasson |

(56) References Cited

U.S. PATENT DOCUMENTS

| | | |
|---|---|---|
| 2002/0022995 A1 | 2/2002 | Miller et al. |
| 2002/0023059 A1 | 2/2002 | Bari et al. |
| 2002/0026390 A1 | 2/2002 | Ulenas et al. |
| 2002/0029187 A1 | 3/2002 | Meehan et al. |
| 2002/0042738 A1 | 4/2002 | Srinivasan et al. |
| 2002/0099602 A1 | 7/2002 | Moskowitz et al. |
| 2002/0107718 A1 | 8/2002 | Morrill et al. |
| 2002/0129282 A1 | 9/2002 | Hopkins |
| 2002/0147625 A1 | 10/2002 | Kolke, Jr. |
| 2002/0161648 A1 | 10/2002 | Mason et al. |
| 2002/0198784 A1 | 12/2002 | Shaak et al. |
| 2003/0004855 A1 | 1/2003 | Dutta et al. |
| 2003/0009392 A1 | 1/2003 | Perkowski |
| 2003/0036914 A1 | 2/2003 | Fitzpatrick et al. |
| 2003/0041008 A1 | 2/2003 | Grey et al. |
| 2003/0046149 A1 | 3/2003 | Wong |
| 2003/0069740 A1 | 4/2003 | Zeidman |
| 2003/0088511 A1 | 5/2003 | Karboulonis et al. |
| 2003/0093331 A1 | 5/2003 | Childs et al. |
| 2003/0110100 A1 | 6/2003 | Wirth, Jr. |
| 2003/0131095 A1 | 7/2003 | Kumhyr et al. |
| 2003/0139969 A1 | 7/2003 | Scroggie et al. |
| 2003/0158792 A1 | 8/2003 | Perkowski |
| 2003/0163340 A1 | 8/2003 | Fitzpatrick et al. |
| 2003/0167213 A1 | 9/2003 | Jammes et al. |
| 2003/0217002 A1 | 11/2003 | Enborg |
| 2004/0006509 A1 | 1/2004 | Mannik et al. |
| 2004/0015416 A1 | 1/2004 | Foster et al. |
| 2004/0055017 A1 | 3/2004 | Delpuch et al. |
| 2004/0078388 A1 | 4/2004 | Melman |
| 2004/0128320 A1 | 7/2004 | Grove et al. |
| 2004/0172379 A1 | 9/2004 | Mott et al. |
| 2004/0174979 A1 | 9/2004 | Hutton et al. |
| 2004/0204991 A1 | 10/2004 | Monahan et al. |
| 2004/0249727 A1 | 12/2004 | Cook, Jr. et al. |
| 2005/0021666 A1 | 1/2005 | Dinnage et al. |
| 2005/0038733 A1 | 2/2005 | Foster et al. |
| 2005/0044254 A1 | 2/2005 | Smith |
| 2005/0060664 A1 | 3/2005 | Rogers |
| 2005/0097204 A1 | 5/2005 | Horowitz et al. |
| 2005/0131837 A1 | 6/2005 | Sanctis et al. |
| 2005/0203888 A1 | 9/2005 | Woosley et al. |
| 2005/0273378 A1 | 12/2005 | MacDonald-Korth et al. |
| 2006/0009994 A1 | 1/2006 | Hogg et al. |
| 2006/0031240 A1 | 2/2006 | Eyal et al. |
| 2006/0041638 A1 | 2/2006 | Whittaker et al. |
| 2006/0058048 A1 | 3/2006 | Kapoor et al. |
| 2006/0069623 A1 | 3/2006 | MacDonald Korth et al. |
| 2006/0085251 A1 | 4/2006 | Greene |
| 2006/0173817 A1 | 8/2006 | Chowdhury et al. |
| 2007/0073641 A1 | 3/2007 | Perry et al. |
| 2007/0078726 A1 | 4/2007 | MacDonald Korth et al. |
| 2007/0245013 A1 | 10/2007 | Saraswathy et al. |

FOREIGN PATENT DOCUMENTS

| | | |
|---|---|---|
| EP | 0636993 | 4/1999 |
| EP | 0807891 | 5/2000 |
| EP | 1241603 | 3/2001 |
| JP | 2001283083 | 10/2001 |
| WO | 97/17663 | 5/1997 |
| WO | 98/32289 | 7/1998 |
| WO | 98/47082 | 10/1998 |
| WO | 99/59283 | 11/1999 |
| WO | 00/25218 | 5/2000 |

OTHER PUBLICATIONS

2ROAM, Inc., multiple archived pages of www.2roam.com retrieved via Internet Archive Wayback Machine on Jun. 10, 2008.

Alt et al., "Bibliography on Electronic Commerce," Electronic Markets—The International Journal, Oct. 1993, 5 pages, vol. 3, No. 3.

Alt et al., "Computer Integrated Logistics," Electronic Markets—The International Journal, Oct. 1993, 1 page, vol. 3, No. 3.

auctionwatch.com, multiple pages—including search results for "expedition," printed Apr. 21, 2001.

auctiva.com, Multiple pages., undated but website copyright date is "1999-2000."

Braganza, "IS Research at Cranfield—A Look at the Future," Electronic Markets—The International Journal, Oct. 1993, 1 page, vol. 3, No. 3.

Brecht et al., "The IM 2000 Research Programme," Electronic Markets—The International Journal, Oct. 1993, 1 page, vol. 3, No. 3.

Business Wire business editors/high-tech writers, "2Roam Partners With Pumatech to Delivery Wireless Alerts," Business Wire, Dec. 18, 2000.

Business Wire business editors/high-tech writers, "2Roam Takes eHow's How-to Solutions Wireless: With 2Roam, the Web's One-Stop Source for Getting Things Done is on More Wireless Devices, with Ability to Purchase its Products from Anywhere," Business Wire, Oct. 2, 2000.

Business Wire business editors/high-tech writers, "2Roam Drives Hertz to the Wireless Web; Number One Car Rental Company to Provide Customers Wireless Access From Any Device," Business Wire, Aug. 7, 2001.

buy.com, www.buy.com homepage, printed Oct. 13, 2004.

Clarke, "Research Programme in Supra-organizational Systems," Electronic Markets—The International Journal, Oct. 1993, 2 pages, vol. 3, No. 3.

Clemons et al., "Evaluating the prospects for alternative electronic securities markets," Proceedings of the twelfth international conference on information systems, New York, New York, United States, pp. 53-64, 1991.

friendster.com, Homepage and "more info" pages, printed Apr. 29, 2004.

Google News archive search for "2Roam marketing" performed over the date range 2000-2003.

Google News archive search for "2Roam SMS" performed over the date range 2000-2008.

Grabowski et al., "Mobile-enabled grid middleware and/or grid gateways," GridLab—A Grid Application Toolkit and Testbed, Work Package 12—Access for Mobile Users, Jun. 3, 2003.

Graham, "The Emergence of Linked Fish Markets in Europe," Electronic Markets—The International Journal, Jul. 1998, 4 pages, vol. 8, No. 2.

Gunthorpe et al., "Portfolio Composition and the Investment Horizon," Financial Analysts Journal, Jan.-Feb. 1994, pp. 51-56.

Halperin, "Toward a Process Handbook for Organizational Coordination Processes," Electronic Markets—The International Journal, Oct. 1993, 1 page, vol. 3, No. 3.

Hess et al., "Computerized Loan Origination Systems: An Industry Case Study of the Electronic Markets Hypothesis," MIS Quarterly, Sep. 1994, pp. 251-275.

IBM, "Anonymous Delivery of Goods in Electronic Commerce," IBM Technical Disclosure Bulletin, Mar. 1996, pp. 363-366, vol. 39, No. 3.

IBM, "Personal Optimized Decision/Transaction Program," IBM Technical Disclosure Bulletin, Jan. 1995, pp. 83-84, vol. 38, No. 1.

IEEE 100—The Authoritative Dictionary of IEEE Standards Terms, Seventh Edition, 2000. Entire book cited; table of contents, source list, and terms beginning with A included. ISBN 0-7381-2601-2.

Ives et al., "Editor's Comments—MISQ Central: Creating a New Intellectual Infrastructure," MIS Quarterly, Sep. 1994, p. xxxv.

Klein, "Information Logistics," Electronic Markets—The International Journal, Oct. 1993, pp. 11-12, vol. 3, No. 3.

Klein, "Introduction to Electronic Auctions," Electronic Markets—The International Journal, Dec. 1997, 4 pages, vol. 7, No. 4.

Kubicek, "The Organization Gap," Electronic Markets—The International Journal, Oct. 1993, 1 page, vol. 3, No. 3.

Kuula, "Telematic Services in Finland," Electronic Markets—The International Journal, Oct. 1993, 1 page, vol. 3, No. 3.

(56) References Cited

OTHER PUBLICATIONS

Lalonde, "The EDI World Institute: An International Approach," Electronic Markets—The International Journal, Oct. 1993, 1 p., vol. 3, No. 3.
Lee et al., "Intelligent Electronic Trading for Commodity Exchanges," Electronic Markets—The International Journal, Oct. 1993, 2 pages, vol. 3, No. 3.
Lee et al., "Electronic Brokerage and Electronic Auction: The Impact of IT on Market Structures," Proceedings of the 29th Annual Hawaii International COnference on System Sciences, 1996, pp. 397-406.
Lee, "AUCNET: Electronic Intermediary for Used-Car Transactions," Electronic Markets—The International Journal, Dec. 1997, pp. 24-28, vol. 7, No. 4.
Live365 press release, "Live365 to Offer Opt-In Advertising on Its Website," Oct. 15, 2004.
London Business School, "Overture and Google: Internet Pay-Per-Click (PPC) Advertising Options," Mar. 2003.
M2 Presswire, "Palm, Inc.: Palm unveils new web browser optimised for handhelds; HTML browser offers highspeed web-browsing option," Mar. 13, 2002.
Malone et al., "Electronic Markets and Electronic Hierarchies," Communications of the ACM, Jun. 1987, pp. 484-497, vol. 30, No. 6.
Mansell et al., "Electronic Trading Networks: The Route to Competitive Advantage?" Electronic Markets—The International Journal, Oct. 1993, 1 page, vol. 3, No. 3.
Mardesich, "Onsale takes auction gavel electronic," Computer Reseller News, Jul. 8, 1996, pp. 2, 32.
Marteau, "Shop with One Click, Anywhere, Anytime," Information Management and Consulting, 2000, pp. 44-46, vol. 15, No. 4.
Massimb et al., "Electronic Trading, Market Structure and Liquidity," Financial Analysts Journal, Jan.-Feb. 1994, pp. 39-49.
McGinity, "Build Your Weapon," PC Magazine, Apr. 24, 2011, printed from www.pcmag.com/print_article2/0,1217,a%253D3955,00.asp.
Meade, "Visual 360: a performance appraisal system that's 'fun,'" HRMagazine, 44, 7, 118(3), Jul. 1999.
"Mediappraise: Mediappraise Receives National Award for Web-based Technology That Enables Companies to Solve Thorny HR Problem," Dec. 14, 1998.
Medvinsky et al., "Electronic Currency for the Internet," Electronic Markets—The International Journal, Oct. 1993, 2 pages, vol. 3, No. 3.
metails.com, www.metails.com homepage, printed Oct. 13, 2004.
Microsoft Computer Dictionary, Fifth Edition, front matter and p. 33.
Microsoft Computer Dictionary, Fifth Edition, front matter, back matter, and pp. 479, 486.
Neches, "FAST—A Research Project in Electronic Commerce," Electronic Markets—The International Journal, Oct. 1993, 4 pages, vol. 3, No. 3.
Neo, "The implementation of an electronic market for pig trading in Singapore," Journal of Strategic Information Systems, Dec. 1992, pp. 278-288, vol. 1, No. 5.
O'Mahony, "An X.500-based Product Catalogue," Electronic Markets—The International Journal, Oct. 1993, 2 pages, vol. 3, No. 3.
"ONSALE: ONSALE Brings Thrill of Auctions and Bargain Hunting Online; Unique Internet retail service debuts with week-long charity auction for The Computer Museum in Boston," May 24, 1995, printed from www.dialogweb.com/cgi/dwclient?dwcommand=DWEPRINT%20810-489267.
"ONSALE joins fry as online shopping picks up speed: Internet Booms," Computer Reseller News, Jun. 5, 1995, p. 73.
Palm, Inc., Palm™ Web Pro Handbook, copyright 2002-2003.
Post et al., "Application of Auctions as a Pricing Mechanism for the Interchange of Electric Power," IEEE Transactions on Power Systems, Aug. 1995, pp. 1580-1584, vol. 10, No. 3.
Preist et al., "Adaptive agents in a persistent shout double auction," International Conference on Information and Computation, Proceedings of the first international conference on Information and computation economies, Oct. 25-28, 1998, Charleston, United States, pp. 11-18.
Qualcomm, "Brew Developer Support," printed from web.archive.org/web/20020209194207/http://www.qualcomm.com/brew/developer/support/kb/52.html on Aug. 30, 2007.
RCR Wireless News, "Lockheed Martin to use 2Roam's technology for wireless platform," RCR Wireless News, Sep. 10, 2001.
Reck, "Formally Specifying an Automated Trade Execution System," J. Systems Software, 1993, pp. 245-252. vol. 21.
Reck, "Trading-Process Characteristics of Electronic Auctions," Electronic Markets—The International Journal, Dec. 1997, pp. 17-23, vol. 7, No. 4.
repcheck.com, www.repcheck.com homepage, printed from web.archive.org/web/20020330183132/http://repcheck.com on Sep. 5, 2009.
Resnick et al., "Reputation Systems," Communications of the ACM, Dec. 2000, pp. 45-48, vol. 43, No. 12.
Rockoff et al., "Design of an Internet-based system for remote Dutch auctions," Internet Research: Electronic Networking Applications and Policy, 1995, pp. 10-16, vol. 5, No. 4.
Rysavy, "Mobile-commerce ASPs do the legwork," Network Computing, Jan. 22, 2001, p. 71, 6 pgs., vol. 12, No. 2.
Saunders, "AdFlight to Offer WAP Ads," Oct. 17, 2000, printed from clickz.com/487531/print.
Schmid, "Electronic Markets," Electronic Markets—The International Journal, Oct. 1993, 2 pages, vol. 3, No. 3.
Schwankert, "Matsushita Taps 2Roam for Wireless Solutions," www.internetnews.com/bus-news.article.php/674811, Feb. 2, 2001.
Siegmann, "Nowhere to go but up," PC Week, Oct. 23, 1995, 3 pages, vol. 12, No. 42.
Telephony Staff, "Air-ASP," Telephony Online, Oct. 2, 2000, 3 pages.
Teo, "Organizational Factors of Success in Using EDIS: A Survey of Tradenet Participants," Electronic Markets—The International Journal, Oct. 1993, 2 pages, vol. 3, No. 3.
Tjostheim et al., "A case stud of an on-line auction for the World Wide Web," printed from www.nr.no/gem/elcom/publikasjoner/enter98e.html on Jun. 10, 1999, 10 pages.
Turban, "Auctions and Bidding on the Internet: An Assessment," Electronic Markets—The International Journal, Dec. 1997, 5 pages, vol. 7, No. 4.
ubid.com, "How do I Update my Address, Phone, Credit Card, Password, etc.?" printed from web.archive.org/web/20010208113903/www.ubid.com/help/topic13.asp on Aug. 30, 2007.
ubid.com, "How do I track my shipment?" printed from web.archive.org/web/20010331032659/www.ubid.com/help/topic27.asp on Aug. 30, 2007.
ubid.com, "Can I track all my bids from My Page?" printed form web.archive.org/web/20010208114049/www.ubid.com/help/topic14.asp on Aug. 30, 2007.
Van Heck et al., "Experiences with Electronic Auctions in the Dutch Flower Industry," Electronic Markets—The International Journal, Dec. 1997, 6 pages, vol. 7, No. 4.
Verizon Wireless, "Verizon Wireless Customers Get It NowSM; Get Games, Get Pix, Get Ring Tones and Get Going in Full Color," press release to PRNewsWire, Sep. 23, 2002.
Warbelow et al., "AucNet: TV Auction Network System," Harvard Business School 9-190-001, Jul 19, 1989, rev. Apr. 12, 1996, pp. 1-15.
Weber, "How Financial Markets are Going On-line," Electronic Markets—The International Journal, Oct. 1993, 2 pages, vol. 3, No. 3.
Wireless Internet, "DailyShopper Selects 2Roam to Enable Mobile Customers to Retrieve Nearby Sales and Promotions Information," Wireless Internet, Apr. 2001.
Wireless Week, "Verizon Wireless Gets Going on BREW Agenda," Wireless Week, Sep. 23, 2002.
xchanger.net, Webpage printed from www.auctiva.com/showcase/as_4sale.asp?uid=xchanger, undated but at least as early as Oct. 12, 2000.
Yu et al., "Distributed Reputation Management for Electronic Commerce," Computational Intelligence, 2002, pp. 535-549, vol. 18, No. 4.
Zetmeir, Auction Incentive Marketing, print of all pages of website found at home.earthlink.net/~bidpointz/ made Oct. 8, 2004.
Zimmermann, "Integration of Financial Services: The TeleCounter," Electronic Markets—The International Journal, Oct. 1993, 1 page, vol. 3, No. 3.
Zwass, "Electronic Commerce: Structures and Issues," International Journal of Electronic Commerce, Fall 1996, pp. 3-23, vol. 1, No. 1.

* cited by examiner

300

PRICING AND FORECASTING

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. The Field of the Invention

The present invention relates generally to a system and method for optimizing prices for products.

2. Description of Related Art

Sellers have often relied on price optimization techniques to assist in establishing the optimal pricing of products in order to achieve established business objectives. Price optimization typically involves several different steps. The first step of price optimization may involve gathering demand data for a product from a database containing historical sales information. Demand data may include both demand, e.g., volume of units sold, and demand factors, e.g., price, promotions, seasonal information, etc. Once a sufficient amount of demand data has been gathered, the next step involves quantifying any relationships or trends between the demand and the demand factors. This may involve applying statistical methods, sometimes referred to as regression analysis, for modeling the demand of a product as a function of its associated demand factors. The goal of the modeling is to determine the values of parameters that "best fit" the demand factors to the demand. The next step of price optimization involves using the values of the parameters determined in the previous step to determine a solution to one or more price optimization equations. The solution to the price optimization equations may correspond to an optimal price for a product. The optimal price may then be used to define a listing price for the product.

The increased proliferation of transactions for products and services over electronic networks, such as the Internet, has allowed for the increased automation of price optimization techniques. These techniques allow the pricing of products listed on an e-commerce website to be adjusted monthly, weekly, daily or even hourly to maintain optimal prices in light of current market conditions and ever-changing business objectives. Indeed, due to the highly competitive on-line sales environment, the success of an e-commerce website may be determined in large part by its ability to quickly and optimally price its products.

Despite their increased importance to the success of sellers in the marketplace, presently available price optimization techniques have fallen short in their ability to meet some of the business objectives dictated by sellers. One shortcoming of presently available price optimization techniques is the inability to take into account some of the indirect benefits related to listing a particular product for sale. These indirect benefits may include the ability of a product to increase the sales of other products listed on an e-commerce website by the mere presence of the product on the website. In this type of a situation, it may be undesirable to sell out of the product too soon.

Unfortunately, currently available price optimization techniques may allow an inventory of the product to be exhausted too soon, thereby causing the loss of the indirect benefits provided by the availability of the product. It would therefore be an improvement over the presently available price optimization techniques to define an optimal price for a product that is predicted not to cause an inventory of the product to be exhausted during a time interval established by the seller.

Another shortcoming of the presently available price optimization techniques is the inability to establish reliable pricing for products that have limited or no historical sales information. For example, using presently available price optimization techniques, it may be difficult to define an optimal price for a product due to the lack of sufficient demand data to reliably perform a regression analysis. Some attempts have been previously made to overcome the lack of sufficient historical sales information for a product. These attempts have included applying clustering techniques to a group of products to thereby determine clusters of analogous products. A product with limited historical sales information was then associated to one of the product clusters. The historical sales information for the products in the associated cluster was then utilized in a price optimization technique to thereby determine an optimal price for the product with the limited historical sales information. However, while a step in the right direction, the past techniques for determining the similarity between products for clustering purposes have often produced unsatisfactory and unreliable results. It would therefore be an improvement over the presently available techniques to more accurately determine whether products are in fact analogous for clustering purposes.

Another shortcoming of the presently available price optimization techniques is the inability to establish reliable price elasticity models in the absence of complete historical promotions data. In particular, where past promotions data for a product is absent, it is difficult to predict the effect that changes in the price of a product will have on the demand for the product. Therefore, there exists a need for accounting for future promotions on the price elasticity of a product in the absence of historic promotions data.

The previously available art is thus characterized by several disadvantages that are addressed by certain embodiments of the present invention. Embodiments of the present invention minimize, and in some aspects eliminate, the above-mentioned failures, and other problems, by utilizing the methods and structural features described herein. The features and advantages of the invention will be set forth in the following description, and in part will be apparent from the description, or may be learned by the practice of the invention without undue experimentation. The features and advantages of the invention may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
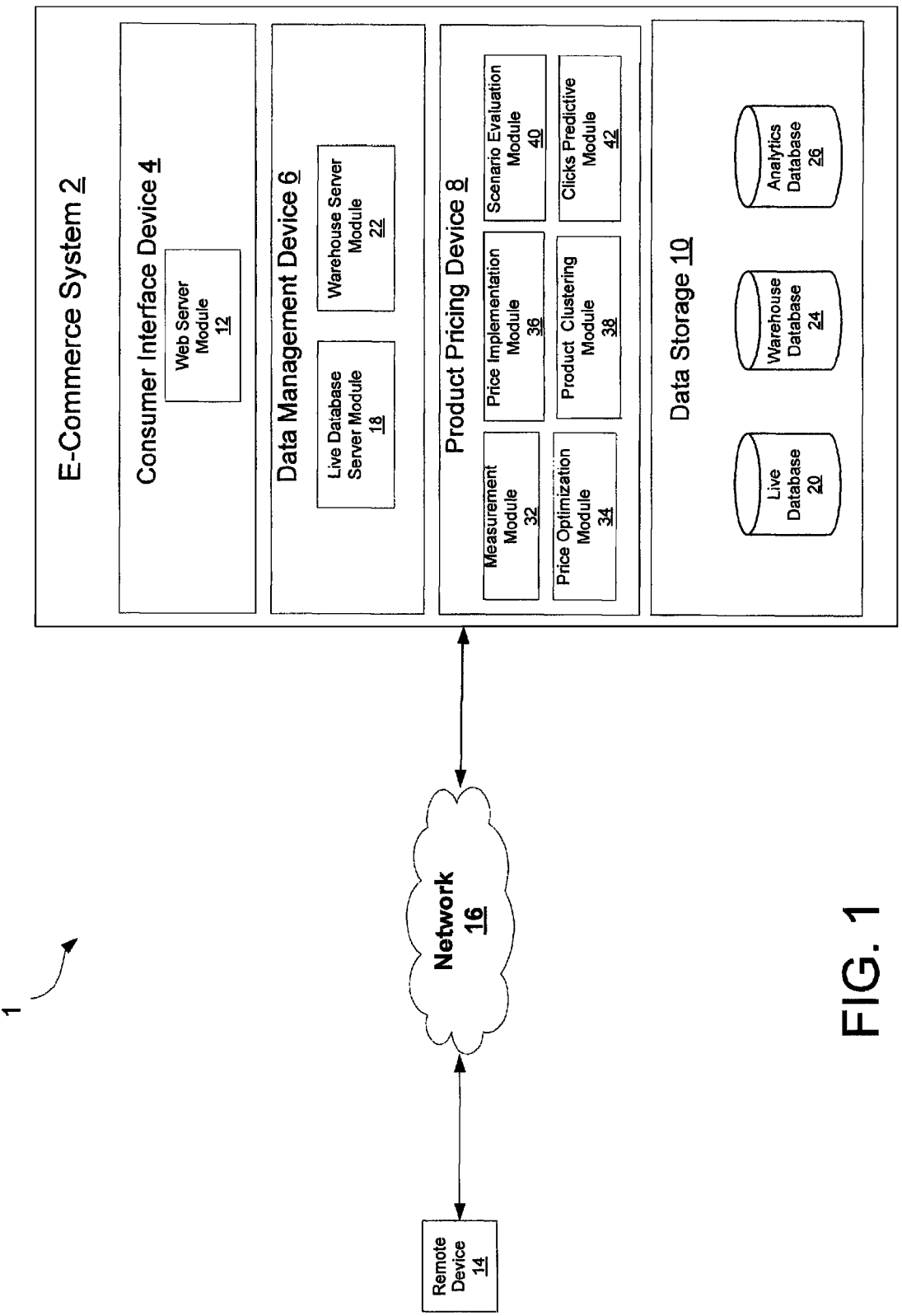
FIG. 1 is a block diagram of an e-commerce system and environment in which the present invention may be practiced.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise.

As used herein, the terms "comprising," "including," "containing," "having," "characterized by," and grammatical equivalents thereof are inclusive or open-ended terms that do not exclude additional, unrecited elements or method steps.

As used herein, the term "product" may refer to any type of good, intangible, property or service offered for sale by a seller.

As used herein, the term "constraint" may refer to a condition that a solution to a price optimization equation must satisfy.

As used herein, a "cluster" or "clustering" of products may refer to a grouping of products that are more similar to each other than to other products.

As used herein, an "optimal price" for a product is a price for the product that is predicted to achieve a desired business objective based upon historical sales information of the product or a cluster of analogous products. An optimal price may be a solution to a price optimization equation. An optimal price may not, however, actually achieve the desired business objective.

As used herein, a "listing price" is a price at which a product has been offered or will be offered for sale. A listing price may be defined based upon an optimal price.

Turning now to the applicants' invention, the present disclosure may provide a method, computer-readable medium, and system for optimizing the pricing of products. The present disclosure may further provide a method, computer-readable medium, and system for clustering products. The present disclosure may further provide a method, computer-readable medium, and system for evaluating different pricing scenarios. It will be appreciated that while the present disclosure may be particularly adapted for use in optimizing prices for products listed for sale on e-commerce websites, that the present disclosure is also suitable for use in pricing products for sale in traditional retail outlets, such as department stores, grocery stores, and the like.

Referring now to the figures, and in particular with reference to FIG. 1, there is illustrated an exemplary e-commerce environment 1 in accordance with an embodiment of the present disclosure. The e-commerce environment 1 may facilitate the conducting of business transactions between an e-commerce system 2 and a remote device 14. In particular, the e-commerce system 2 and the remote device 14 may facilitate the conducting of business transactions over an electronic network 16, such as the Internet. As shown, the e-commerce system 2 may comprise various components, including a consumer interface device 4, a data management device 6, a product pricing device 8, and a data storage 10.

The consumer interface device 4 may allow a consumer situated at the remote device 14 to interact with the e-commerce system 2 over the network 16. In particular, the e-commerce system 2 may host a website having one or more webpages. The consumer interface device 4 may comprise a web server module 12 for retrieving and serving specific webpages of the website in response to requests generated at a remote device 14 by the consumer. The requests for the webpages may be received, and the webpages may be served, over the network 16. The web server module 12 may also include other functionality, such as executing applications for processing data, necessary for operating as a web server. It will be appreciated that the remote device 14 may take the form of one of a wide variety of electronic devices with the ability to communicate over a network, including smart phones, desktop computers, wi-fi enabled devices, laptop computers, and the like. The web server module 12 may include a feature for tracking user clicks on webpages. For example, an invisible piece of tracking code may be placed on the webpages served by the web server module 12 to the remote device 14 as is known to one having ordinary skill in the art.

The data management device 6 may comprise a live database server module 18 and a warehouse server module 18. The live database server module 18 provides the necessary database functionality and support to the e-commerce system 2 in association with providing the webpages to the remote device 14. The live database server module 18 may comprise a suitable database management program product for managing, sorting, organizing, manipulating and retrieving data stored in a live database 20. The database management program product may also provide tools for allowing users to run manual and automated queries of the live database 20 as is known to one having ordinary skill in the art.

The live database 20 may reside in the data storage 10. The data storage 10 may comprise a high performance electronic storage device, such as a hard disk. The live database 20 may comprise a grouping of databases residing on an array of high performance electronic storage devices. The particular requirements for the live database 20 may be determined by the volume of business transacted by the e-commerce system 2. The live database 20 may comprise the necessary data to support the business transactions conducted through the e-commerce system 2. The data in the live database 20 may include, inter alia, the necessary product information to generate sales listings. This product information may include product descriptions, current listing prices, product inventory levels, and digital images of the products. The product information may further include taxonomy information about the products such that they may be classified in the appropriate sales categories by the e-commerce system 2.

The web server module 12 and the live database server module 18 may operate collectively to allow a consumer to purchase products from the remote device 14. In a typical transaction, a consumer may access the website hosted by the e-commerce system 2 through a web browser running on the remote device 14 as is known to one having ordinary skill in the art. The website may include one or more webpages that may in turn comprise a plurality of sales listings for products. These sales listings may be dynamically generated from the product information stored in the live database 20 at the time of the request. The web browser running on the remote device 14 may display the current listing prices of the products to a consumer via a display device, such as a computer monitor, along with any other information necessary for a consumer to purchase one of the products. A consumer may purchase one of the listed products by initiating a "check-out" procedure, which may require the consumer to provide the necessary payment information and shipping information.

Once a product has been purchased, the specific details of the transaction may be automatically saved in the live database 20 by the live database server module 18. The transaction details may include information on the purchase price, the date and time sold, whether the product was subject to a promotion, and information regarding the consumer. The live database server module 18 may also update information stored in the live database 20 based upon the transaction. For example, the live database server module 18 may update the quantity of the product remaining in inventory based upon the transaction details. The live database server module 18 may also automatically generate a report of the purchase, which is then provided either electronically or in hard copy to an order fulfillment center (not shown). The order fulfillment center may then package and ship the purchased product to the address specified by the purchaser. The purchase of the product may also be reported to a financial department (not shown).

From time to time, the live database server module 18 may provide some or all of the data in the live database 20 to the warehouse server module 22, which then causes the data to be stored in a warehouse database 24. This process may be automated to occur at a predetermined frequency. The warehouse server module 22 may comprise a suitable database management program product for managing, sorting, organizing, manipulating and retrieving data stored in the warehouse database 24. The database management program product may also provide tools for allowing users to run manual and automated queries of the warehouse database 24 as is known to one having ordinary skill in the art. The warehouse database 24 may reside on the data storage 10. The warehouse database 24 may comprise a grouping of databases residing on an array of high performance electronic storage devices.

As mentioned, the warehouse server module 22 stores the data provided from the database server module 18 in the warehouse database 24. In addition, the warehouse server module 22 may include additional data regarding the products offered for sale through the e-commerce system 2 as will be disclosed herein. The warehouse server module 22 may generate, either automatically or in response to a user request, data sets, which may be generated directly or indirectly from the data stored in the warehouse database 24. The data sets generated by the warehouse server module 22 may be stored in an analytics database 26, which may also be managed by the warehouse server module 22 and stored in the data storage 10. The analytics database 26 may comprise a grouping of databases residing on an array of high performance electronic storage devices. The data in the analytics database 26 may be used for analysis purposes, including price optimization as will be described herein.

The e-commerce system 2 may further include an input device and an output device. The input device may allow a user to interact with the various components of the e-commerce system 2 and the output device may display information generated by the components of the e-commerce system 2 to a user. In one scenario, a user may interact via the input device with the warehouse server module 22 to thereby control the contents of the data sets generated from the data stored in the warehouse database 24.

Figure 2A:
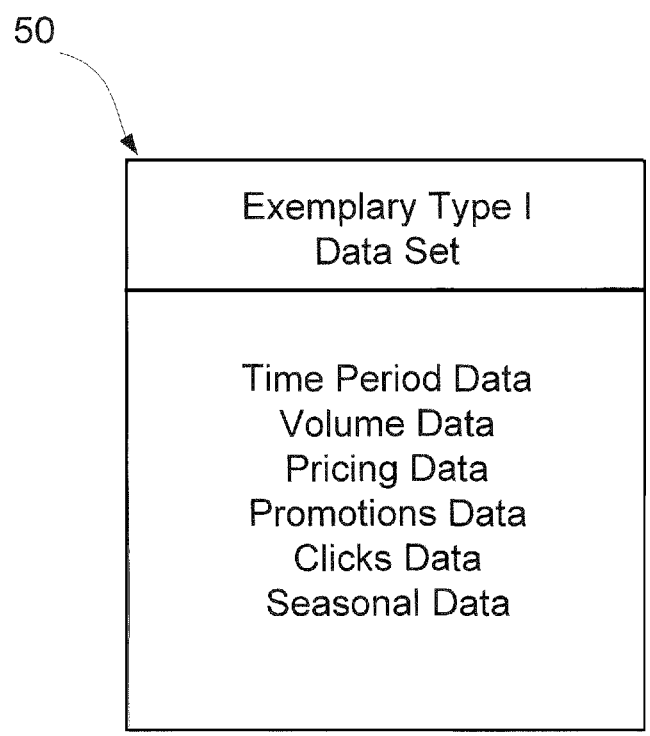
FIG. 2A is a block diagram representing an exemplary data set having demand data.

Some of the data sets generated by the warehouse server module 22 may comprise two types, namely, a Type I data set and a Type II data set. Type I data sets may comprise historical sales information regarding a product. In an embodiment of the present disclosure, Type I data sets may include product demand data that may be used as the independent and dependent variables in a regression analysis as will be described hereinafter. FIG. 2A depicts an exemplary data set 50 representing a Type I data set pursuant to an embodiment of the present disclosure. The data set 50 may include data related to Time Period Data, Volume Data, Pricing Data, Promotions Data, Clicks Data, and Seasonal Data for a product.

The Time Period Data may identify relevant time periods for which sales were made for a product. The Volume Data may indicate the demand for the product expressed as the number of units sold of the product during each of the relevant time periods. The Pricing Data may indicate the price for the product during each of the relevant time periods. The Promotions Data may comprise a binary indicator that indicates whether any promotions were carried out for the product during each of the relevant time periods. The Clicks Data may indicate web traffic data, e.g., the number of potential purchasers that viewed a sales listing for the product during each of the relevant time periods. The Seasonal Data may comprise a numerical indicator that indicates seasonal information for the product during each of the relevant time periods. The information in the Pricing Data, Promotions Data, Clicks Data, and Seasonal Data may include demand factors for use in a regression analysis. It will be appreciated that other demand factors may be included in a Type I data set.

Type II data sets may comprise additional product and business information that may be utilized in determining an optimum price for a product using a price optimization computation. The data in Type II data sets may be defined by a user and input by the user via an input device, such as a keyboard.

The data in Type II data sets may be utilized to define the constraints of price optimization equations as will be explained in greater detail hereinafter. An optimal price determined for a product must satisfy these constraints.

Figure 2B:
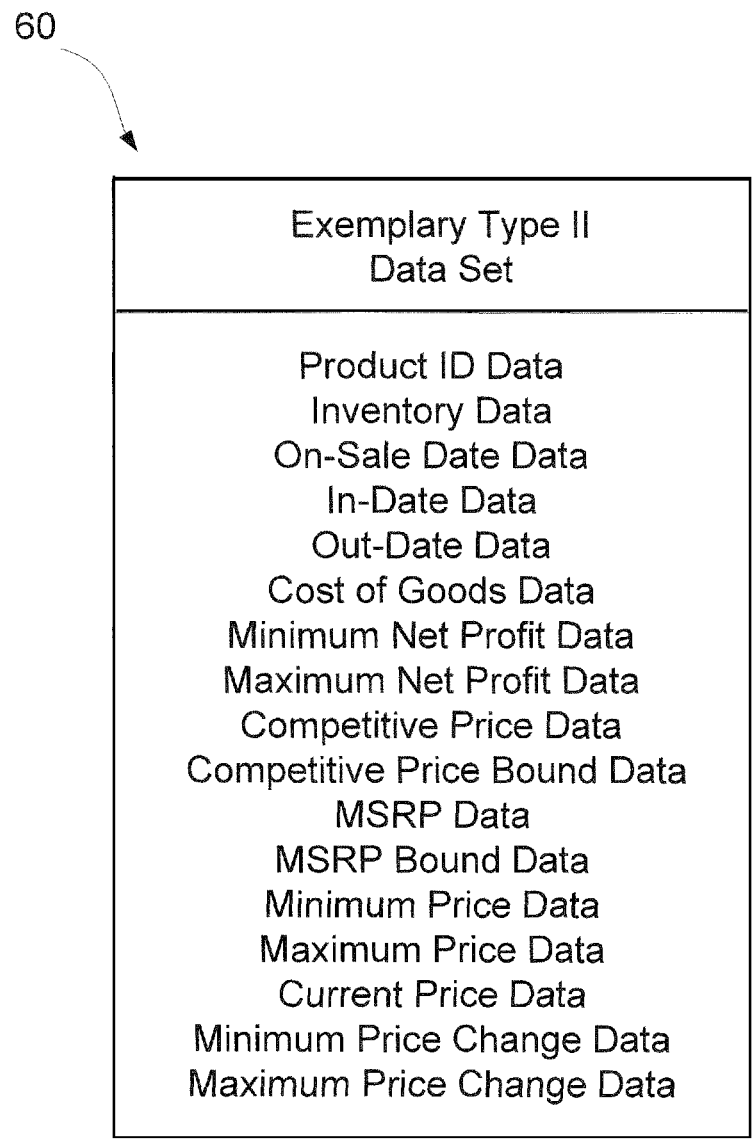
FIG. 2B is a block diagram representing an exemplary data set having constraint data.

FIG. 2B depicts an exemplary data set 60 representing a Type II data set pursuant to an embodiment of the present disclosure. The data set 60 may include data related to Product ID Data, Inventory Data, On-Sale Date Data, In-Date Data, Out-Date Data, Cost of Goods Data, Minimum Net Profit Data, Maximum Net Profit Data, Competitive Price Data, Competitive Price Bound Data, MSRP Data, MSRP Bound Data, Minimum Price Data, Maximum Price Data, Current Price Data, Minimum Price Change Data, and Maximum Price Change Data.

The Product ID Data may identify a product by a unique identifier, such as a stock keeping unit ("SKU"). The Inventory Data may indicate the inventory of the product, i.e., the remaining quantity of any unsold product. Where no sales of the product have yet occurred, the Inventory Data may comprise the initial inventory of the product. The On-Sale Date Data may indicate a date when the product went on sale or is going on sale.

The In-Date Data may include a first time parameter for the product. The first time parameter may be utilized to define a first time interval during which the quantity of the product sold should not exceed the available inventory of the product. That is, the inventory of the product should not be exhausted at the end of the first time interval. As previously, mentioned, this feature may allow the indirect benefits associated with listing a product to be maximized. For example, the mere presence of a sales listing for a product on an e-commerce website may increase the traffic visiting the website and increase the sales of other products. If the product has sold-out too soon, sales revenues may actually decrease due to the loss of the traffic brought to the e-commerce website by the sales listing for the product.

The Out-Date Data may include a second time parameter for the product. The second time parameter may be utilized to define a second time interval; at the end of which the inventory of the product should be exhausted. It will be appreciated that the specification of the second time parameter may allow the product's inventory to be sold out by a specified date. This feature is important for inventory management purposes.

The first time parameter and the second time parameter may comprise a specific end date for the first and second time intervals, such as Dec. 31, 2010, or a range of dates that define the first and second time intervals, such as Oct. 15, 2010 through Dec. 31, 2010, or a time interval, such as four weeks, or any other time-related parameter that may be used to define a time interval. Thus, it will be appreciated that the first time parameter and the second time parameter may include any data that may be used to determine a time interval or an end of a time interval. The first time parameter and the second time parameter may be entered by a user using an input device. The first time parameter and the second time parameter may be stored in the warehouse database 24.

The Cost of Goods Data may define a cost of the product to the seller. It will be appreciated that the cost of the product may include not only the actual cost of the product to the seller, but also other costs, such as shipping, storage, advertising, packaging, and any other costs to the seller related to the product. The Minimum Net Profit Data may define a minimum net profit for the product. The minimum net profit for the product may be defined as a percentage value of the cost as defined by the Cost of Goods Data or as a specific monetary amount. The Maximum Net Profit Data may define a maximum net profit for the product. The maximum net profit for the product may be defined as a percentage value of the cost as defined by the Cost of Goods Data or as a specific monetary amount.

The Competitive Price Data may comprise a competitor's selling price for the product, if that information is available. The Competitive Price Bound Data may define an upper and lower price-bound percentage for the product relative to a competitor's price as defined by the Competitive Price Data. The Competitive Price Data and the Competitive Price Bound Data may ensure that a price determined for the product is within a predetermined percentage of a competitor's price. In an embodiment of the present disclosure, the Competitive Price Data may include an average of several competitors' prices for the product.

The MSRP Data may include a manufacture's suggested retail price for the product. The MSRP Bound Data may define an upper and lower price bound, by a percentage amount, for the product relative to a manufacture's suggested retail price as defined by the MSRP Data. In an embodiment of the present disclosure, the upper bound on the price of the product may simply be the manufacturer's suggested retail price as it is almost never desired to list a product at a price above the manufacturer's suggested retail price.

The Minimum Price Data may define a minimum price for the product. The Maximum Price Data may define a maximum price for the product. That is, the price of the product should not be defined to be less than the minimum price or greater than the maximum price. The Current Price Data may identify the current listing price for the product. The Minimum Price Change Data may define, as a percentage amount of the current listing price, the minimum allowable price change for the product. The Maximum Price Change Data may define, as a percentage amount of the current listing price, the maximum allowable price change for the product. Once generated, Type I and Type II data sets may be stored in the analytics database 26.

Referring now back to FIG. 1, as mentioned, the e-commerce system 2 comprises the product pricing device 8. The purpose of the product pricing device 8 is to facilitate the establishment of optimal prices for products. The product pricing device 8 may further generate other data, such as price elasticity data, for assisting in evaluating pricing scenarios for products. The product pricing device 8 may comprise a measurement module 32, a price optimization module 34, and a price implementation module 36. Each of these will be explained below.

The measurement module 32 may be operable to perform a regression analysis using the demand data, i.e., the demand and the demand factors, in a Type I data set generated for a product. The regression analysis computation may include a previously selected regression equation that has been shown to provide reliable results. In an embodiment of the present disclosure, the measurement module 32 may solve for "unknown" parameters of the selected regression equation that best fit the demand factors to the demand.

It will be appreciated by those having ordinary skill in the art, that any suitable regression equation that has been determined to provide reliable results may be utilized. In an embodiment of the present disclosure, the regression equation may take the general form of:

$$Y = f(X, \beta) \quad \text{(Eq. 1)}$$

where the unknown parameters are denoted as $\beta$, the independent variables (demand factors) as X, and the dependent variable (demand) as Y. The measurement module 32 may solve for the unknown parameters, $\beta$, of Eq. 1 based upon the demand data in a Type I data set generated for a product. The unknown parameters, β, may be estimated using known computation techniques so as to give a "best fit" to the demand data in the Type I data set as is known to one having ordinary skill in the art.

In an embodiment of the present disclosure, the values of the independent variables X and the dependent variable Y of Eq. 1 may be derived from historical sales information for a product. In an embodiment of the present disclosure, the values of the independent variables X and the dependent variable Y of Eq. 1 may be derived from the data in a Type I data set. For example, referring back to the exemplary data set 50 of a Type I data set depicted in FIG. 2A, the value of the dependent variable Y of Eq. 1 may be derived from the Volume Data and the values of the independent variables X may be derived from the Pricing Data, Promotions Data, Clicks Data, and the Seasonal Data. It will be appreciated that the measurement module 32 may comprise a set of computer-readable instructions that, when executed by a computer processor, are operable to determine the values for the parameters β in Eq. 1. Once the measurement module 32 has determined values for the parameters β of Eq. 1, the parameters β may be output for use in a price optimization computation as will be described below.

The price optimization module 34 may be operable to define optimal prices for products in accordance with objective business criteria established by an operator of the e-commerce system 2. In an embodiment of the present disclosure, the price optimization module 34 may utilize the values of the parameters β of Eq. 1 as determined by the measurement module 32. In an embodiment of the present disclosure, the price optimization module 34 may utilize the data in a Type II data set generated for a product to define one or more pricing constraints. The price optimization module 34 may utilize one or more suitable price optimization equations to define product pricing that is predicted or forecasted to achieve the desired business objectives of the operator of the e-commerce system 2 based upon historical sales data. In particular, the solution to a price optimization equation may be an optimal price for a product that is predicted to achieve a desired business objective based upon the historical sales information related to the product. It will be appreciated, however, that the optimal price established by a price optimization equation need not actually achieve the desired business objective.

Figure 3:
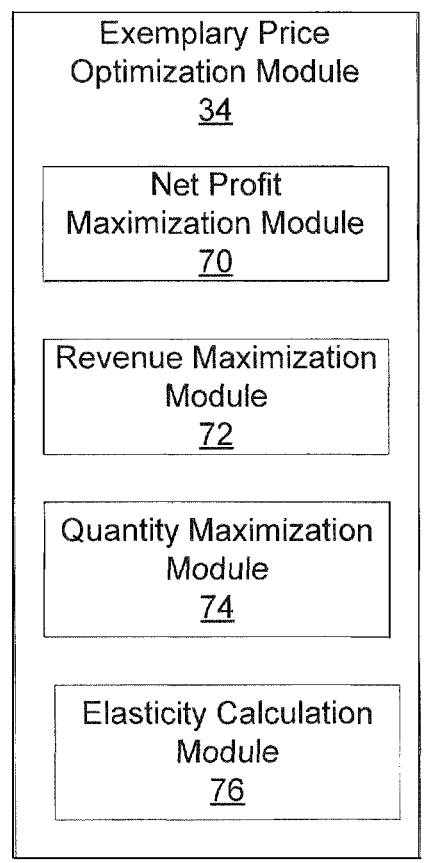
FIG. 3 is a block diagram of an exemplary price optimization module.

Referring now to FIG. 3, the price optimization module 34 may comprise a net profit maximization module 70, a revenue maximization module 72, and a quantity maximization module 74 pursuant to an embodiment of the present disclosure. The output of each of the modules 70, 72, and 74 is an optimal price for a product based upon the inferred business objective, i.e., net profit maximization, revenue maximization, and quantity maximization, respectively. The output of each of the modules 70, 72, and 74 may be displayed to a user on an output device (not shown). The output of each of the modules 70, 72, and 74 may be utilized to establish actual listing prices for products that are displayed in sales listings on webpages of the website hosted by the e-commerce system 2.

Because each of their respective business objectives is mutually exclusive, each of the modules 70, 72, and 74 must employ a different price optimization equation for defining the optimal prices of products as will now be explained. The net profit maximization module 70 may employ a price optimization equation to define an optimal price for a product that is predicted to maximize a net profit generated by the sale of the product. The revenue maximization module 72 may employ a price optimization equation to define an optimal price for a product that is predicted to maximize a gross revenue generated by the sale of the product. The quantity maximization module 74 may employ a price optimization equation to define an optimal price for a product that is predicted to maximize a quantity of the product sold. Even though the exact forms of the price optimization equations utilized by the modules 70, 72, and 74 are mutually exclusive of each other, the different price optimization equations utilized by the modules 70, 72, and 74 may each comprise a plurality of common constraints that are not mutually exclusive with each other.

The price optimization module 34 may further include an elasticity calculation module 76 for determining a price elasticity for a product based upon historical sales information. In its simplest form, price elasticity may be expressed as a ratio of the percentage change in quantity demanded to the percentage change in price. As previously discussed, the price elasticity for a product may be useful in defining a price for the product.

As discussed above, the values of the independent variables X and the dependent variable Y of Eq. 1 may be derived from historical information, such as the data in a Type I data set. For example, referring back to the exemplary data set 50 of a Type I data set depicted in FIG. 2A, the value of the dependent variable Y of Eq. 1 may be derived from the Volume Data and the values of the independent variables X may be derived from the Pricing Data, Promotions Data, Clicks Data, and the Seasonal Data. In some instances, however, historical Promotions Data may not be available or simply may be incomplete. Further, a future promotions calendar may also be unavailable to determine the occurrence of future promotions. Thus, it may be difficult to isolate the effect that price has on demand in the absence of historical and future data on promotions using the previously available analytical techniques.

In the absence of historical and future promotions information, the present invention is able to utilize spikes in the number of clicks on product pages to indicate when past promotions occurred. That is, historical clicks data may be utilized as a proxy for historical Promotions Data. Moreover, predicted click amounts may then be used as a proxy for having a long-range and forward-looking promotions calendar. In this regard, the product pricing device 8 may further comprise a clicks prediction module 42. In an embodiment of the present disclosure, the clicks prediction module 42 may predict future clicks as a proxy for future promotions. In an embodiment of the present disclosure, the clicks prediction module 42 may eliminate the uplift in product sales provided by past promotions in a predictive model, such as a pricing model.

Figure 14A:
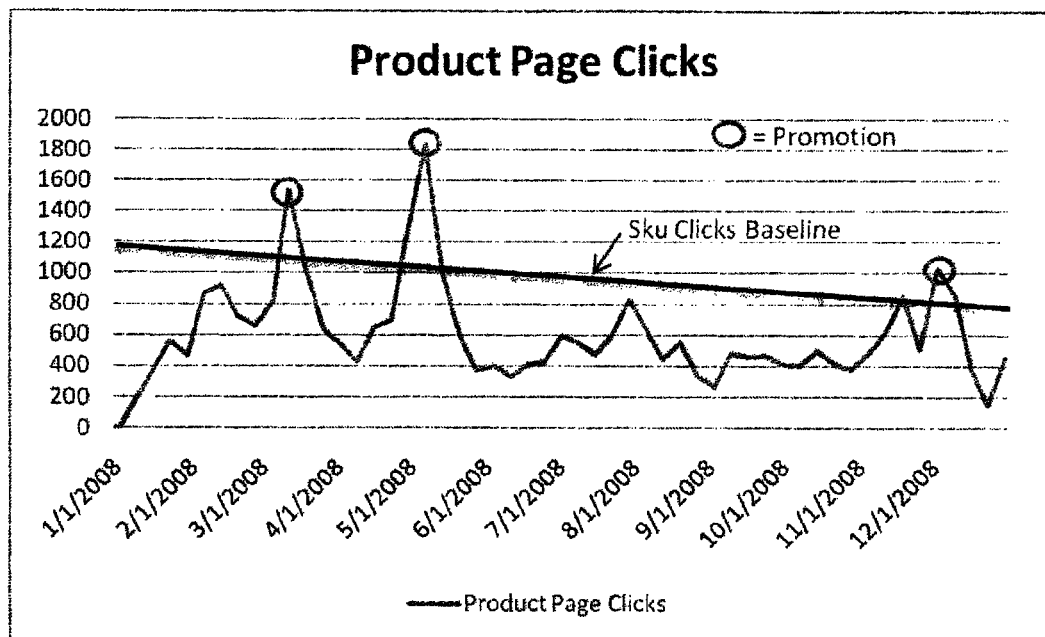
FIG. 14A depicts an exemplary graph showing the relationship between spikes in clicks on a product webpage and promotions.

Referring now to FIG. 14A, there is depicted a graph 300 of product page clicks for a product over a time period. The number of clicks on a product page for the product is represented along the y-axis and time is represented along the x-axis. The spikes in clicks above the clicks baseline in FIG. 14A may be inferred to have been caused by past promotions. In an embodiment of the present disclosure, a spike in clicks may refer to click amounts that are in the range of 10-200% above the baseline click amount. In an embodiment of the present disclosure, a spike in clicks may refer to click amounts that are greater than the baseline click amount.

Figure 14B:
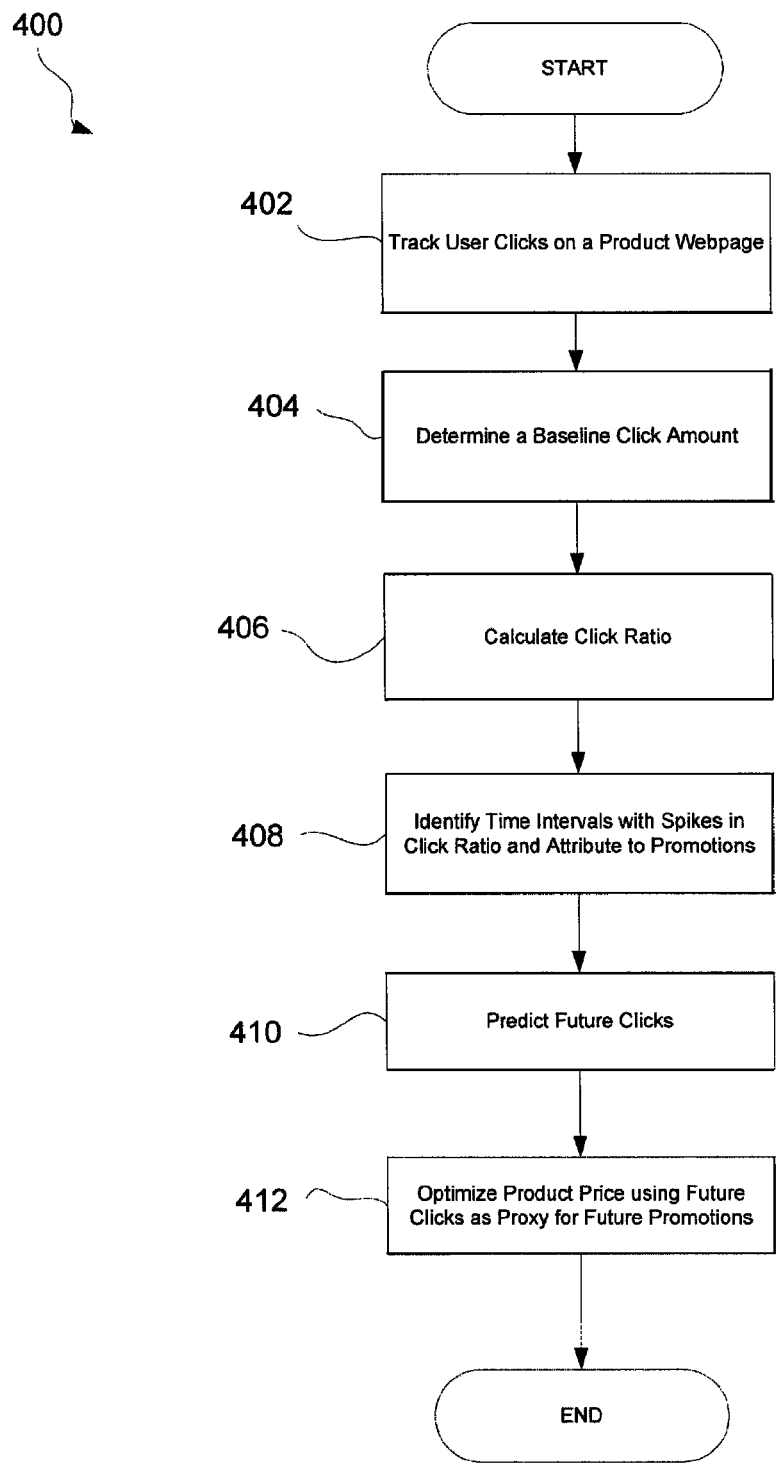
FIG. 14B is a high level flowchart of an exemplary process by which click data may be utilized as a proxy for promotions data.

Referring principally to FIG. 14B, with reference to FIGS. 1 and 14A, there is shown a high-level process 400 to predict future clicks as a proxy for having a long-range, forward-looking promotional calendar. The process 400 in FIG. 14B is implemented by the product pricing device 8, and in particular, the clicks predictive module 42. The process begins at block 402 where user click information on a product webpage hosted by the e-commerce system 2 may be tracked and stored in the warehouse database 24. This may be accomplished by placing a piece of invisible code onto the webpage as is known to one having ordinary skill in the art. The user click information may record the date and time of each click on the product page as well as the number of clicks over a pre-specified time period. In an embodiment of the present disclosure, the number of clicks may be tracked on a weekly basis over a period of one year.

At block 404, the clicks prediction module 42 determines a baseline clicks amount for the product over the time period. At block 406, the clicks prediction module 42 calculates the ratio of clicks each week compared to the baseline clicks amount determined at block 404. At block 408, the clicks prediction module 42 attributes weeks with large spikes in the click ratios to past promotions. At block 410, the clicks prediction module 42 predicts future click amounts using a regression analysis. At block 412, the predicted future clicks may be utilized by the price optimization module 34 as a proxy for future promotions data to determine an optimized price for the product. Alternatively, at block 412, the price optimization module 34 may determine a price elasticity using the predicted future clicks.

Figure 14C:
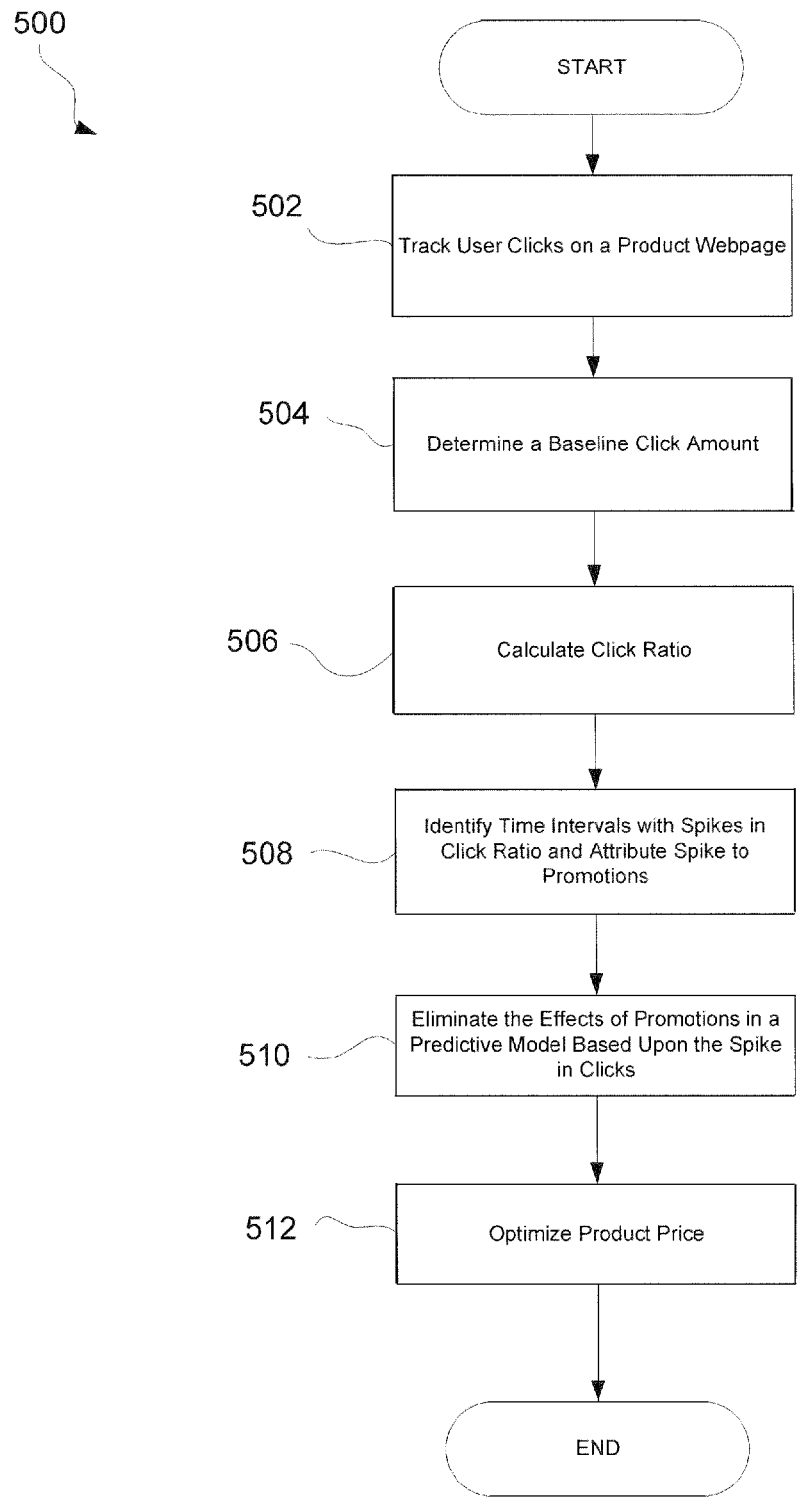
FIG. 14C is a high level flowchart of an exemplary process by which click data may be utilized to eliminate the effects of past promotions from pricing models in the absence of historical promotions data.

Referring now to FIG. 14C, with reference to FIGS. 1 and 14A, there is shown a high-level process 500 to eliminate the effects of past promotions on a given predictive model using historical click data. The process 500 in FIG. 14C is implemented by the product pricing device 8, and in particular, the clicks predictive module 42. The process begins at block 502 where user click information on a product webpage hosted by the e-commerce system 2 may be tracked and stored in the warehouse database 24. This may be accomplished by placing a piece of invisible code onto the webpage as is known to one having ordinary skill in the art. The user click information may record the date and time of each click on the product page as well as the number of clicks over a pre-specified time period. In an embodiment of the present disclosure, the number of clicks may be tracked on a daily or weekly basis over a period of one year.

At block 504, the clicks prediction module 42 determines a baseline clicks amount for the product webpage over a given time period. At block 506, the clicks prediction module 42 calculates the ratio of clicks for time intervals within the given time period, such as days or weeks. At block 508, the clicks prediction module 42 attributes time intervals with spikes in the click ratios to past promotions. At block 510, the clicks prediction module 42 eliminates the effect of promotions in a predictive model based upon the spikes in the click ratios. That is, the future sales for a product are predicted using a predictive model that has had the effects of past promotions removed, since the ability to predict future promotions is uncertain. At block 512, the price, or sales volume, of the product is optimized to meet predetermined objective business criteria using the appropriate predictive pricing model that has had the effects of past promotions removed. Alternatively, at block 512, the price optimization module 34 may determine a price elasticity using the appropriate predictive model with the influence of past promotions removed based upon the click data.

For example, if the normal or baseline clicks for a product were 20 clicks for a given time interval, such as one day, and a spike of 30 clicks was observed for a similar time interval, the click ratio would be 1.5. It particular, the spike to 30 clicks would be assumed to have occurred due to a past promotion of some sort. The number of sales for the time interval with the click spike would then be divided by 1.5 to get the expected sales if there had been no promotional uplift. If, for example, the product sold 15 units, it would be assumed that without the assumed-to-have-occurred promotion, the sales would have been only 10 units. The adjusted number of 10 units would then be used in the appropriate predictive model to thereby eliminate the effects of past promotions in predicted sales for future time periods. This is necessary since a forward-looking promotions calendar may not be available or reliable.

Figure 4:
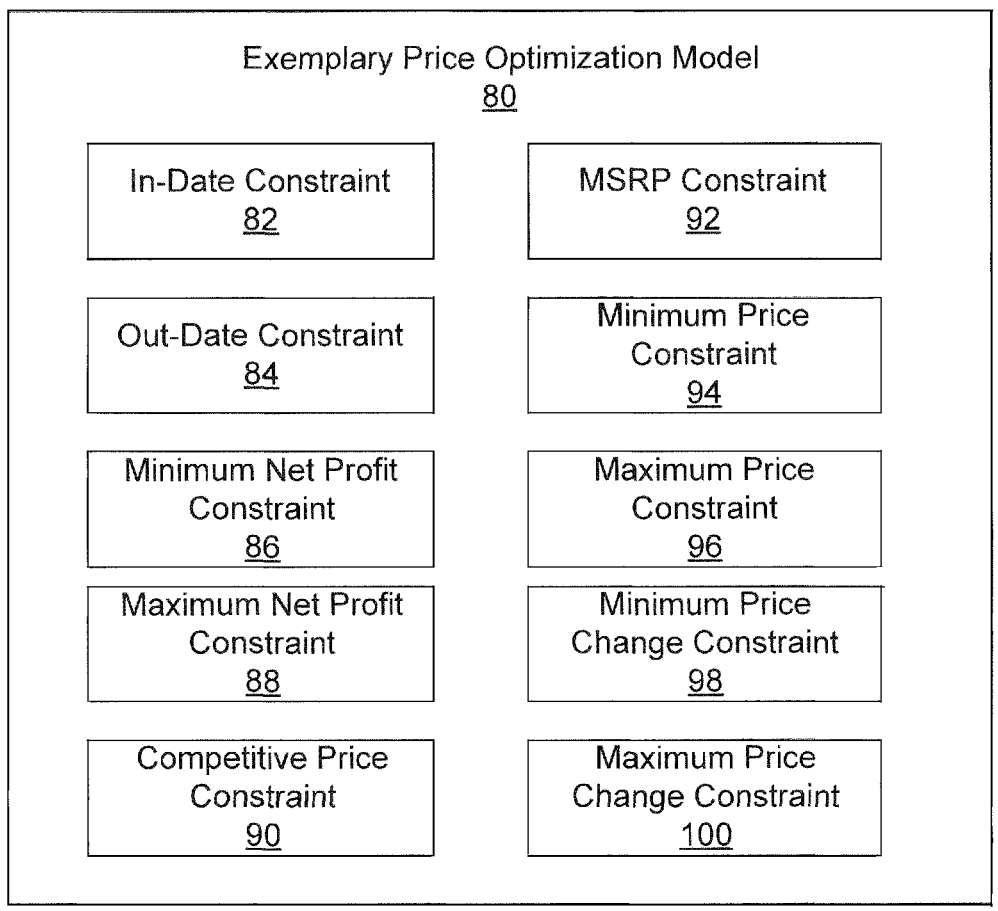
FIG. 4 is a block diagram of an exemplary price optimization model.

Referring now to FIG. 4, there is depicted a block diagram of an exemplary price optimization model 80 suitable for use with the modules 70, 72, and 74 pursuant to an embodiment of the present disclosure. The price optimization model 80 may comprise a plurality of pricing constraints that must be satisfied by a solution to any price optimization equation conforming to the model 80. It will be appreciated, however, that the different price optimization equations utilized by the modules 70, 72 and 74 may comprise one, all, or none of the pricing constraints identified in the model of the price optimization model 80. Further, the model 80 may be applied to almost any price optimization equation.

The price optimization model 80 may include an In-Date Constraint 82, an Out-Date Constraint 84, a Minimum Net Profit Constraint 86, a Maximum Net Profit Constraint 88, a Competitive Price Constraint 90, an MSRP Constraint 92, a Minimum Price Constraint 94, a Maximum Price Constraint 96, a Minimum Price Change Constraint 98, and a Maximum Price Change Constraint 100.

The In-Date Constraint 82 requires that an optimal price determined for a product using the price optimization model 80 be predicted to not exhaust an inventory of the product during a first time interval. That is, the quantity of a product predicted to be sold at the optimal price during the first time interval should be less than the quantity of the product in inventory. The In-Date Constraint 82 may be defined using data in a Type II data set generated for the relevant product. For example, the In-Date Constraint 82 may be defined using product data from the Inventory Data and In-Date Data as shown in the data set 60 depicted in FIG. 2B.

The Out-Date Constraint 84 requires that an optimal price determined for a product using the price optimization model 80 be predicted to exhaust an inventory of the product by the end of a second time interval, which is subsequent to the end of the first time interval. That is, the quantity of the product predicted to be sold at the optimal price by the end of the second time interval should equal the quantity of product remaining in inventory after the end of the first time interval. The Out-Date Constraint 84 may be defined using data in a Type II data set generated for the relevant product. For example, the Out-Date Constraint 84 may be defined using product data from the Inventory Data and Out-Date Data as shown in the data set 60 depicted in FIG. 2B.

The Minimum Net Profit Constraint 86 requires that an optimal price determined for a product using the price optimization model 80 be predicted to produce no less than a minimum net profit. The Minimum Net Profit Constraint 86 may be defined using data in a Type II data set generated for the relevant product. For example, the Minimum Net Profit Constraint 86 may be defined using product data from the Cost of Goods Data and the Minimum Net Profit Data shown in the data set 60 depicted in FIG. 2B.

The Maximum Net Profit Constraint 88 requires that an optimal price determined for a product using the price optimization model 80 be predicted to produce no more than a maximum net profit. The Maximum Net Profit Constraint 88 may be defined using data in a Type II data set generated for the relevant product. For example, the Maximum Net Profit Constraint 88 may be defined using product data from the Cost of Goods Data and the Maximum Net Profit Data shown in the data set 60 depicted in FIG. 2B.

The Competitive Price Constraint 90 requires that an optimal price determined for a product using the price optimization model 80 be within a predetermined range of a competitor's price for the same or similar product. The Competitive Price Constraint 90 may be defined using data in a Type II data set generated for the relevant product. For example, the Competitive Price Constraint 90 may be defined using product data from the Competitive Price Data and the Competitive Price Bound Data shown in the data set 60 depicted in FIG. 2B.

The MSRP Constraint 92 requires that an optimal price determined for a product using the price optimization model 80 be within a predetermined range of a manufacturer's suggested retail price for the product. The MSRP Constraint 92 may be defined using data in a Type II data set generated for the relevant product. For example, the MSRP Constraint 92 may be defined using product data from the MSRP Data and the MSRP Bound Data shown in the data set 60 depicted in FIG. 2B.

The Minimum Price Constraint 94 requires that an optimal price determined for a product using the price optimization model 80 be greater than a predetermined minimum price. The Minimum Price Constraint 94 may be defined using data in a Type II data set generated for the relevant product. For example, the Minimum Price Constraint 94 may be defined using product data from the Minimum Price Data shown in the data set 60 depicted in FIG. 2B.

The Maximum Price Constraint 96 requires that an optimal price determined for a product using the price optimization model 80 be less than a predetermined maximum price. The Maximum Price Constraint 96 may be defined using data in a Type II data set generated for the relevant product. For example, the Maximum Price Constraint 96 may be defined using product data from the Maximum Price Data shown in the data set 60 depicted in FIG. 2B.

The Minimum Price Change Constraint 98 requires that an optimal price determined for a product using the price optimization model 80 be greater than a predetermined percentage of the current price of a product. The Minimum Price Change Constraint 98 may be defined using data in a Type II data set generated for the relevant product. For example, the Minimum Price Change Constraint 98 may be defined using product data from the Current Price Data and the Minimum Price Change Data shown in the data set 60 depicted in FIG. 2B.

The Maximum Price Change Constraint 100 requires that an optimal price determined for a product using the price optimization model 80 be less than a predetermined percentage of the current price of a product. The Maximum Price Change Constraint 100 may be defined using data in a Type II data set generated for the relevant product. For example, the Maximum Price Change Constraint 100 may be defined using product data from the Current Price Data and the Maximum Price Change Data shown in the data set 60 depicted in FIG. 2B.

Example 1

The following discussion will treat an example of an exemplary price optimization equation with an in-date constraint and an out-date constraint. That is, a solution to the exemplary price optimization equation is predicted to price products such that they will not be expected to run out of inventory before a certain data and the same solution is predicted to price products such that they will be expected to run out of inventory before a certain date. The following notation will be used in association with the exemplary price optimization equation:

| | |
|---|---|
| $q^{it}$ | Quantity of item i in period t |
| A | Set of SKUs in the choice set |
| B | Cardinality of set A |
| $I_i$ | Inventory of product i |
| T | Number of periods over which to optimize |
| t | Index for time periods |
| $s_t$ | Seasonality for period t |
| $p_{it}$ | Price of item i in period t |
| $d_{it}$ | Deal percentage of item i in period t |
| $\beta_x$, $\beta_{xy}$, $\beta_{xyz}$ | Constants in the MNL regression model |

The exemplary price optimization equation comprises the following equations:

$$Pr(y_{it} = 1) = \frac{I(i \in A)\exp(V_{it})}{\left(1 + \sum_{j=1}^{B} I(i \in A)\exp(V_{jt})\right)} \quad \text{Eq. (2)}$$

$$V_{it} = \beta_{0it} + \beta_1 p_{i,t-1} + \beta_2 d_{i,t-1} + p_{i,t}(\beta_3 + \beta_4 s_t) + d_{i,t}(\beta_5 + B_6 s_t) \quad \text{Eq. (3)}$$

$$q_{it} = I(i \in A) Q^M Pr(y_{it} = 1) \quad \text{Eq. (4)}$$

$$\sum_{t=1}^{x} q_{it} \leq I_i \quad \text{Eq. (5)}$$

$$\sum_{t=1}^{y} q_{it} \geq I_i \quad \text{Eq. (6)}$$

Under the multi-nominal logic formulation (MNL), given a set of product A with product i belonging to set A, the probability that a randomly arriving customer will purchase product i is estimated by Eq. (2). $V_{it}$ is defined by Eq. (3). Combining the probability estimates from Eq. (2) with the expected traffic $Q^M$, the expected sale for product i in period t is defined by Eq. (4).

For the in-date constraint, assume a user specifies the in-date as x periods away from the current period. Eq. (5) is the constraint that ensures that the quantity sold between now and until x periods into the future will be less than or equal to the inventory currently available. This ensures that over this time period that the inventory will be in stock. For the out-date constraint, assume a user specifies that the out-date as y periods away from the current period. Eq. (6) is the constraint that ensures that the quantity sold between now and until y periods into the future will be greater than or equal to the inventory currently available. This ensures that over this time period that the inventory will be depleted.

It will be appreciated that the above Example 1 should not be considered as limiting on the scope of the present disclosure, but is instead provided to facilitate an understanding of the applicants' invention pursuant to an embodiment of the present disclosure. This now ends the discussion of Example 1.

The general purpose of the price implementation module 36 is to allow a user to determine whether to accept, modify, or reject an optimal price for a product as determined by the price optimization module 34. The price implementation module 36 may cause the optimal price of a product as determined by the price optimization module 34 to be displayed to a user using an output device. A user may then input a command to accept, modify, or reject the optimal price for a product as determined by the price optimization module 34 through an input device. In the event that a user elects to accept the optimal price for a product as determined by the price optimization module 34, the price implementation module 36 will cause the optimal price to be provided to the live database server module 18 such that the listing price of the product stored in the live database 20, if any, may be updated or populated with the optimal price. In an embodiment of the present disclosure, a user may simply manually change the current listing price of the product in the live database 20 based upon the optimal price.

Likewise, if the user elects to modify the optimal price determined by the price optimization module 34, the price implementation module 36 will provide the modified optimal price to the live database server module 18 such that the current listing price of the product stored in the live database 20 may be updated or populated with the modified optimal price. It will be appreciated that the listing price is considered to be based upon the optimal price whether the user accepts the optimal price as calculated by the price optimization module 34 or whether the user modifies the optimal price. If the user elects to reject the optimal price determined by the price optimization module 34, the price implementation module 36 will not change the listing price of the product in the live database 20. In an embodiment of the present disclosure, the price implementation module 36 may automatically update the listing price of a product based upon an optimal price calculated by the price optimization module 34.

Figure 5:
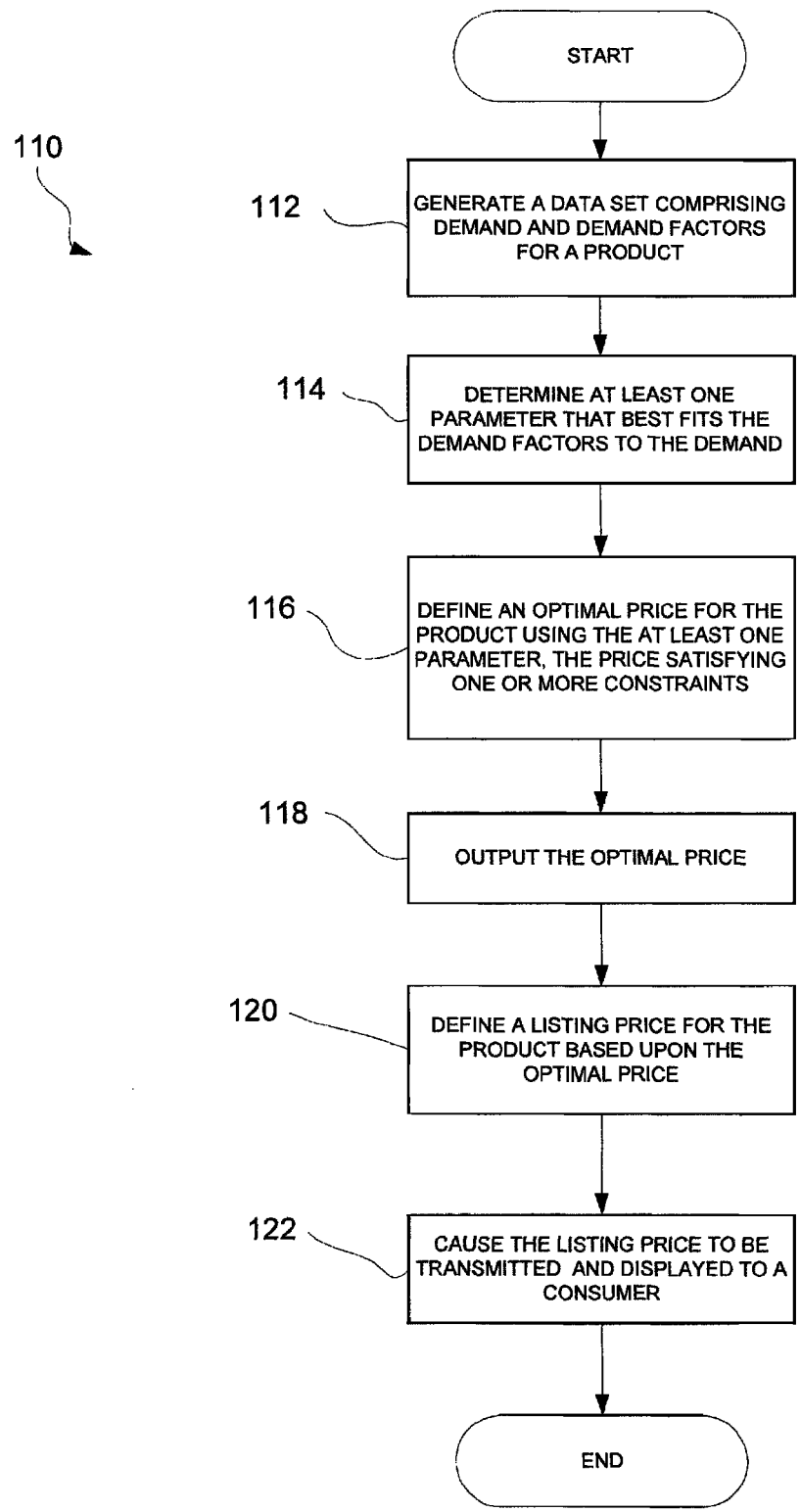
FIG. 5 is a high level flowchart of an exemplary process by which an optimal price for a product may be determined and implemented.

Referring now to FIG. 5, there is shown a flowchart 110 of a computer-implemented method of optimizing a price pursuant to an embodiment of the present disclosure. At step 112, a data set comprising demand data is generated from a database comprising historical sales information. The demand data may comprise demand and demand factors for a product. At step 114, at least one parameter that best fits the demand factors to the demand is determined. At step 116, an optimal price for the product is defined using the at least parameter determined at step 114. The optimal price must, however, satisfy one or more constraints. In an embodiment of the present disclosure, the optimal price must satisfy at least an In-Date Constraint 82 and an Out-Date Constraint 84 as shown in FIG. 4. At step 118, the optimal price determined in the previous step 116 is output to a user. For example, the optimal price may be displayed on a computer monitor to a user. At step 120, a user may cause that the listing price for the product to be defined based upon the optimal price defined at step 116. The listing price may be defined based upon the optimal price or a modified optimal price. At step 122, the listing price is displayed to a consumer. For example, the listing price for the product may be displayed on a web browser of a computer operated by the consumer in a response to a request from the consumer's computer.

Where a product has sufficient historical sales information, its historical sales information may be utilized by the product pricing device 8 to define an optimal price for the product using the measurement module 32 and the price optimization module 34 as explained above. As will now be explained, where a product has insufficient historical sales information to reliably determine an optimal price or a price elasticity for the product, the product pricing device 8 may utilize the historical sales information from a cluster of similar products to assist in defining an optimal price for the product or to determine a price elasticity for the product.

In this regard, the product pricing device 8 may further comprise a product clustering module 38 for clustering similar products based upon a set of descriptive characteristics in common to the products. The products that are typically clustered by the product clustering module 38 may include those products previously or currently sold by the e-commerce system 2. Data related to the descriptive characteristics of the products may be stored in the warehouse database 24.

The descriptive characteristics may comprise both categorical (or qualitative) characteristics and quantitative characteristics. Categorical characteristics may allow products to be grouped into common categories, groups or items of interest. The categories, groups or items of interest may be labeled by names. When stored as data, the categorical characteristics may be expressed as numerical codes. Quantitative characteristics may be those characteristics of a product that are measurable or quantifiable. It will be appreciated, that the present disclosure is not limited to any specific categorical or quantitative characteristics as they will vary from product to product.

To facilitate the clustering process by the product clustering module 38, the warehouse server module 22 may first generate a Type III data set and a Type IV data set. A Type III data set may comprise any data related to the categorical characteristics for a plurality of products. A Type IV data set may comprise any data related to the quantitative characteristics for a plurality of products. (In an embodiment of the present disclosure, the data for the categorical and the quantitative characteristics may be combined into a single data set.) Once generating, the Type III and Type IV data sets may be stored in the analytics database 26.

Figure 6:
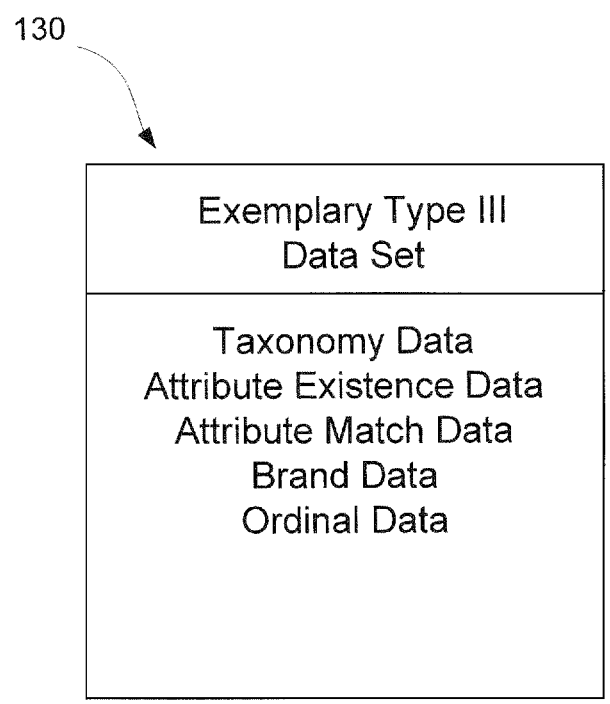
FIG. 6 is a block diagram representing an exemplary data set having categorical data.

Referring now to FIG. 6, there is depicted an exemplary Type III data set 130 having categorical data. In particular, the data set 130 may comprise Taxonomy Data, Attribute Existence Data, Attribute Match Data, Brand Data, and Ordinal Data. Taxonomy Data may classify each product into a hierarchy of products established by an operator of the e-commerce system 2. The hierarchy of products may include a structured collection of terms that is used for both classification and navigation on the e-commerce system 2. The hierarchy of products may be stored in the warehouse database 24 and the live database 20. The hierarchy of products may be transformed into quantitative measures as is known to one having ordinary skill in the art.

Attribute Existence Data may indicate whether a product has a particular attribute. Possible attributes may include, but are not limited to, those distinctive and tangible features of a product that have physical dimensions or are discernable by human senses and that give the product its value to consumers. The Attribute Existence Data may be expressed in the form of a binary indicator. Attribute Match Data may indicate whether two products have a matching attribute. Brand Data may specify a brand of a product. Ordinal Data may comprise any ranking or ordered information related to a product. Again, the categorical data may be expressed as numerical codes as is known to one having ordinary skill in the art.

Figure 7:
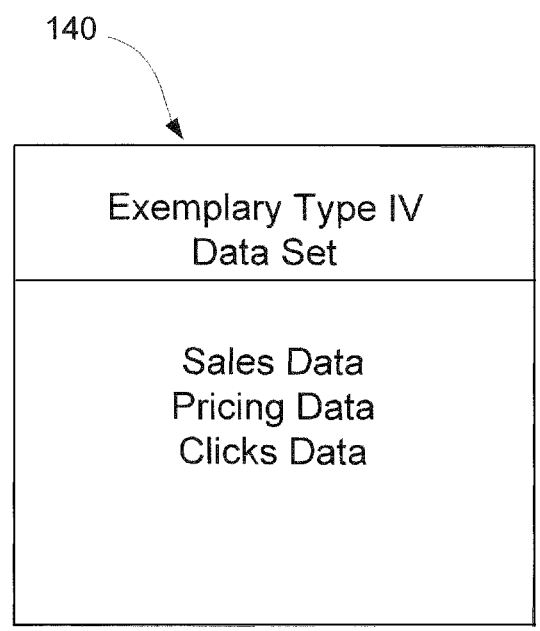
FIG. 7 is a block diagram representing an exemplary data set having quantitative data.

Referring now to FIG. 7, there is depicted an exemplary Type IV data set 140 having quantitative data. In particular, the data set 140 may comprise Sales Data, Pricing Data, and Clicks Data. Sales Data may include any past transactional data for a product as recorded by the e-commerce system 2. For example, the Sales Data may include the volume of units sold each week for the past two years. Pricing Data may indicate at least one of a current listing price and a previous listing price for a product. Clicks Data may represent an aggregate of the number of consumer views of a sales listing for a product on the e-commerce system 2 for a specified time period.

Figure 8:
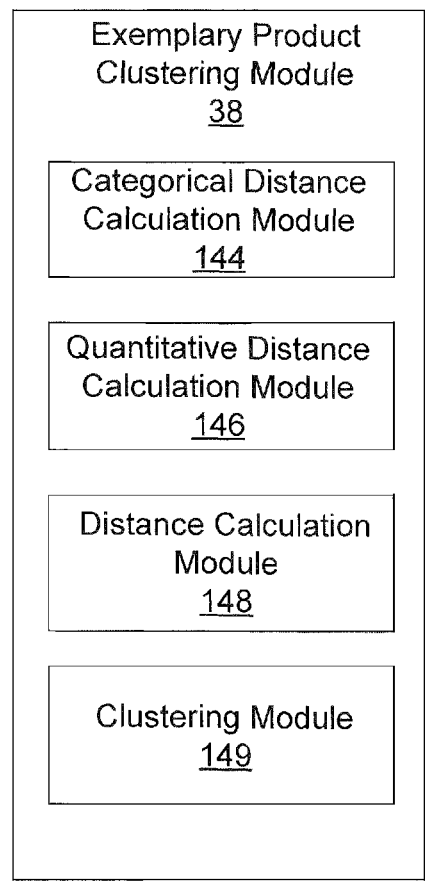
FIG. 8 is a block diagram of an exemplary product clustering module.

Referring now to FIG. 8, the product clustering module 38 may include a categorical distance calculation module 144, a quantitative distance calculation module 146, a distance calculation module 148, and a clustering module 149. Each of these will be described below.

The categorical distance calculation module 144 is operable to determine a first set of distances between each of the products. The first set of distances may include a distance value for each of the categorical characteristics represented in a Type III data set. For example, assuming that the Type III data set includes Taxonomy Data, Attribute Existence Data, Attribute Match Data, Brand Data and Ordinal Data as shown in the exemplary data set 130 shown in FIG. 6, then the first set of distances between any two of the products will include five distance values, namely, a first distance value representing a distance between the taxonomy of the two products, a second distance value representing a distance between the attribute existence of the two products, a third distance value representing a distance between the attribute match of the two products, a fourth distance value representing the distance between the brands of the two products, and a fifth distance value representing a distance between ordinals of the two products.

The distances between the categorical characteristics, i.e., the first set of distances, may be determined using a wide variety of techniques for measuring similarity or dissimilarity, including a Jaccard coefficient technique or a Dice's coefficient technique. A weighting factor may be utilized to weight the first set of distances depending on the relative importance of a specific match as determined by an operator of the e-commerce system 2.

The quantitative distance calculation module 144 is operable to determine a second set of distances between each of the products. The second set of distances may include a distance value for each of the quantitative characteristics represented in a Type IV data set. For example, assuming that the Type IV data set includes Sales Data, Pricing Data, and Clicks Data as shown in the exemplary data set 140 shown in FIG. 7, then the second set of distances between any two of the products will include three distance values, namely, a first distance value representing a distance between the sales of the two products, a second distance value representing a distance between the pricing of the two products, and a third distance value representing a distance between the clicks of the two products.

The distances between the quantitative characteristics, i.e., the second set of distances, may also be determined using a wide variety of techniques for measuring similarity or dissimilarity, including Euclidian distance, Mahalanobis distance, and city-block distance calculations. A weighting factor may be utilized to weight any of the second set of distances. For example, large variances may not be weighted as heavily as the areas that have little variances.

Once the first set of distances and the second set of distances have been determined, the distance calculation module 148 may determine a single distance value between each of the products. The single distance value between each of the products may be determined through a combination of their respective first set of distances and their respective second set of distances. Specific distance values in the first set of distances and the second set of distances may be weighted or further weighted to emphasize or de-emphasize their importance as determined by an operator of the e-commerce system 2.

Once a single distance value has been determined between each of the products, the clustering module 149 may apply a clustering algorithm to thereby group the products into clusters of analogous products. It will be appreciated that each of the clusters may comprise products that are most similar to each other based upon the single distance value.

After the initial clustering of the products has been completed, the clustering module 149 may be further operable to associate a product with limited historical sales information to one of the product clusters. In an embodiment of the present disclosure, a k-means approach may be used to find the closest cluster to the product based upon the available data for the product. It will be appreciated that once a product with limited or no historical sales information has been associated with a particular cluster, that the price optimization module 34 may be utilized to determine at least one of a price elasticity and an optimal price for the product using the historical sales information of the products in the associated cluster.

Figure 9:
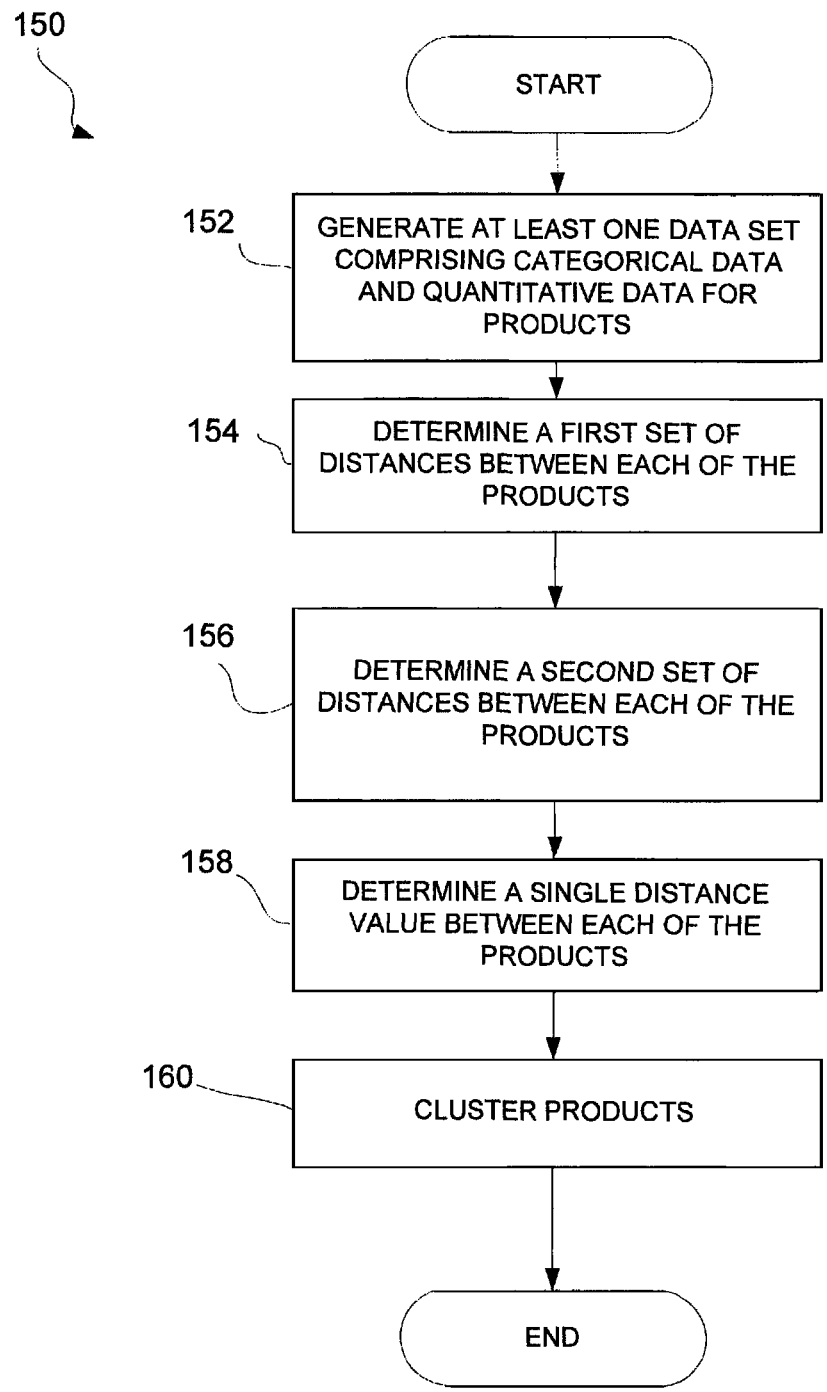
FIG. 9 is a high level flowchart of an exemplary process by which a group of products may be clustered using categorical and quantitative data.

Referring now to FIG. 9, there is shown a flowchart 150 of a computer-implemented method of clustering products using both categorical and quantitative descriptive characteristics. The method begins at step 152 where a database server may generate at least one data set for a group of products from a database. The at least one data set may comprise data relating to both categorical characteristics and quantitative characteristics. At step 154, a first set of distances between each of the products is determined. The first set of distances may comprise a distance value associated with each of the categorical characteristics in the at least one data set. At step 156, a second set of distances between each of the products is determined. The second set of distances may comprise a distance value associated with each of the quantitative characteristics in the at least one data set.

At step 158, a single distance value between each of the products is determined by combining the distances in the first set of distances and the distances in the second set of distances. This step may optionally include weighting any of the specific distances in the first set of distances and the second set of distances. At step 160, the products are clustered according to their single distance values determined at step 158. It will be appreciated that the single distance value, and the product clustering for that matter, are both based upon distance measurements for quantitative characteristics and categorical characteristics.

Example 2

The following discussion will treat an example of determining a single distance value between each of a group of ten products, having both categorical characteristics and quantitative characteristics. It will be appreciated that the example should not be considered as limiting on the scope of the present disclosure, but is instead provided to facilitate an understanding of the applicants' invention. For purposes of the example, it will be assumed that an exemplary Type III data set and an exemplary Type IV data set have been previously generated for the ten products from a database. For purposes of this example, the Type III data set comprises data related to four categorical characteristics, namely, taxonomy data, attribute existence data, attribute match data, and brand data, and the Type IV data set comprises data related to three quantitative characteristics, namely, sales data, price data, and clicks data. (However, for purposes of convenience, the exact data in the exemplary Type III data set and the exemplary Type IV data will not be disclosed herein.)

The first step is to calculate a distance between each of the products for each categorical characteristic contained in the Type III data set. Matrix 1, below, shows a distance value between each of the ten products, individually labeled P1 through P10, for the taxonomy characteristic as calculated from the taxonomy data in the exemplary Type III data set assumed to have been previously generated for the purposes of this example.

| | | | | | Matrix 1 | | | | | |
|---|---|---|---|---|---|---|---|---|---|---|
| Product | P1 | P2 | P3 | P4 | P5 | P6 | P7 | P8 | P9 | P10 |
| P1 | 0 | 0 | 0 | 0 | 0 | 1 | 1 | 1 | 1 | 1 |
| P2 | 0 | 0 | 0 | 0 | 0 | 1 | 1 | 1 | 1 | 1 |
| P3 | 0 | 0 | 0 | 0 | 0 | 1 | 1 | 1 | 1 | 1 |
| P4 | 0 | 0 | 0 | 0 | 0 | 1 | 1 | 1 | 1 | 1 |
| P5 | 0 | 0 | 0 | 0 | 0 | 1 | 1 | 1 | 1 | 1 |
| P6 | 1 | 1 | 1 | 1 | 1 | 0 | 0 | 0 | 0 | 0 |
| P7 | 1 | 1 | 1 | 1 | 1 | 0 | 0 | 0 | 0 | 0 |
| P8 | 1 | 1 | 1 | 1 | 1 | 0 | 0 | 0 | 0 | 0 |
| P9 | 1 | 1 | 1 | 1 | 1 | 0 | 0 | 0 | 0 | 0 |
| P10 | 1 | 1 | 1 | 1 | 1 | 0 | 0 | 0 | 0 | 0 |

Matrix 2, below, shows a distance value between each of the ten products, labeled P1 through P10, for the attribute existence characteristic as calculated from the attribute existence data in the exemplary Type III data set assumed to have been previously generated for the purposes of this example.

| | | | | | Matrix 2 | | | | | |
|---|---|---|---|---|---|---|---|---|---|---|
| Product | P1 | P2 | P3 | P4 | P5 | P6 | P7 | P8 | P9 | P10 |
| P1 | 0.00 | 0.37 | 0.88 | 0.96 | 0.03 | 0.32 | 0.54 | 0.34 | 0.74 | 0.49 |
| P2 | 0.37 | 0.00 | 0.59 | 0.10 | 0.20 | 0.79 | 0.25 | 0.07 | 0.56 | 0.40 |
| P3 | 0.88 | 0.59 | 0.00 | 0.40 | 0.37 | 0.45 | 0.78 | 0.38 | 0.39 | 0.75 |
| P4 | 0.96 | 0.10 | 0.40 | 0.00 | 0.24 | 0.71 | 0.70 | 0.94 | 0.74 | 0.07 |
| P5 | 0.03 | 0.20 | 0.37 | 0.24 | 0.00 | 0.98 | 0.98 | 0.75 | 0.74 | 0.35 |
| P6 | 0.32 | 0.79 | 0.45 | 0.71 | 0.98 | 0.00 | 0.81 | 0.58 | 0.50 | 0.02 |
| P7 | 0.54 | 0.25 | 0.78 | 0.70 | 0.98 | 0.81 | 0.00 | 0.16 | 0.34 | 0.73 |
| P8 | 0.34 | 0.07 | 0.38 | 0.94 | 0.75 | 0.58 | 0.16 | 0.00 | 0.25 | 0.84 |
| P9 | 0.74 | 0.56 | 0.39 | 0.74 | 0.74 | 0.50 | 0.34 | 0.25 | 0.00 | 0.48 |
| P10 | 0.49 | 0.40 | 0.75 | 0.07 | 0.35 | 0.02 | 0.73 | 0.84 | 0.48 | 0.00 |

Matrix 3, below, shows a distance value between each of the ten products, labeled P1 through P10, for the attribute match characteristic as calculated from the attribute match data in the exemplary Type III data set assumed to have been previously generated for the purposes of this example.

| | | | | | Matrix 3 | | | | | |
|---|---|---|---|---|---|---|---|---|---|---|
| Product | P1 | P2 | P3 | P4 | P5 | P6 | P7 | P8 | P9 | P10 |
| P1 | 0.00 | 0.06 | 0.54 | 0.65 | 0.35 | 0.17 | 0.67 | 0.99 | 0.15 | 0.80 |
| P2 | 0.06 | 0.00 | 0.81 | 0.39 | 0.77 | 0.34 | 0.85 | 0.39 | 0.85 | 0.41 |
| P3 | 0.54 | 0.81 | 0.00 | 0.16 | 0.79 | 0.57 | 0.17 | 0.61 | 0.65 | 0.23 |
| P4 | 0.65 | 0.39 | 0.16 | 0.00 | 0.07 | 0.38 | 0.02 | 0.09 | 0.00 | 0.87 |
| P5 | 0.35 | 0.77 | 0.79 | 0.07 | 0.00 | 0.59 | 0.18 | 0.89 | 0.84 | 0.06 |
| P6 | 0.17 | 0.34 | 0.57 | 0.38 | 0.59 | 0.00 | 0.13 | 0.94 | 0.03 | 0.31 |
| P7 | 0.67 | 0.85 | 0.17 | 0.02 | 0.18 | 0.13 | 0.00 | 0.40 | 0.25 | 0.07 |
| P8 | 0.99 | 0.39 | 0.61 | 0.09 | 0.89 | 0.94 | 0.40 | 0.00 | 0.41 | 0.21 |
| P9 | 0.15 | 0.85 | 0.65 | 0.00 | 0.84 | 0.03 | 0.25 | 0.41 | 0.00 | 0.22 |
| P10 | 0.80 | 0.41 | 0.23 | 0.87 | 0.06 | 0.31 | 0.07 | 0.21 | 0.22 | 0.00 |

Matrix 4, below, shows a distance value between each of the ten products, labeled P1 through P10, for the brand characteristic as calculated from the brand data in the exemplary Type III data set assumed to have been previously generated for the purposes of this example.

| | | | | | Matrix 4 | | | | | |
|---|---|---|---|---|---|---|---|---|---|---|
| Product | P1 | P2 | P3 | P4 | P5 | P6 | P7 | P8 | P9 | P10 |
| P1 | 0 | 1 | 0 | 1 | 0 | 1 | 1 | 1 | 1 | 1 |
| P2 | 1 | 0 | 0 | 1 | 1 | 1 | 1 | 1 | 1 | 1 |
| P3 | 0 | 0 | 0 | 0 | 0 | 1 | 1 | 1 | 1 | 1 |
| P4 | 1 | 1 | 0 | 0 | 0 | 1 | 1 | 1 | 1 | 1 |
| P5 | 0 | 1 | 0 | 0 | 0 | 1 | 1 | 1 | 1 | 1 |
| P6 | 1 | 1 | 1 | 1 | 1 | 0 | 0 | 0 | 1 | 1 |
| P7 | 1 | 1 | 1 | 1 | 1 | 0 | 0 | 0 | 1 | 1 |
| P8 | 1 | 1 | 1 | 1 | 1 | 0 | 0 | 0 | 1 | 0 |
| P9 | 1 | 1 | 1 | 1 | 1 | 1 | 1 | 1 | 0 | 1 |
| P10 | 1 | 1 | 1 | 1 | 1 | 1 | 1 | 0 | 1 | 0 |

Once the distances values between each of the products for each of the categorical characteristics has been determined, the next step is to calculate a distance value between each of the products for each of the quantitative characteristics.

Matrix 5, below, shows a distance value between each of the ten products, labeled P1 through P10, for the sales characteristic as calculated from the sales data in the exemplary Type IV data set assumed to have been previously generated for the purposes of this example.

Matrix 5

| Product | P1 | P2 | P3 | P4 | P5 | P6 | P7 | P8 | P9 | P10 |
|---|---|---|---|---|---|---|---|---|---|---|
| P1 | 0.00 | 1.04 | 1.14 | 1.02 | 1.37 | 1.07 | 1.26 | 0.69 | 0.31 | 0.58 |
| P2 | 1.04 | 0.00 | 1.12 | 1.28 | 1.79 | 0.85 | 0.93 | 0.92 | 0.74 | 1.02 |
| P3 | 1.14 | 1.12 | 0.00 | 1.07 | 0.97 | 1.44 | 0.94 | 0.83 | 0.93 | 1.31 |
| P4 | 1.02 | 1.28 | 1.07 | 0.00 | 1.27 | 0.86 | 0.88 | 1.23 | 0.73 | 0.92 |
| P5 | 1.37 | 1.79 | 0.97 | 1.27 | 0.00 | 1.02 | 1.08 | 0.58 | 1.06 | 0.92 |
| P6 | 1.07 | 0.85 | 1.44 | 0.86 | 1.02 | 0.00 | 1.63 | 1.31 | 1.15 | 1.14 |
| P7 | 1.26 | 0.93 | 0.94 | 0.88 | 1.08 | 1.63 | 0.00 | 1.13 | 1.14 | 0.82 |
| P8 | 0.69 | .092 | 0.83 | 1.23 | 0.58 | 1.31 | 1.13 | 0.00 | 0.91 | 0.80 |
| P9 | 0.31 | 0.74 | 0.93 | 0.73 | 1.06 | 1.15 | 1.14 | 0.91 | 0.00 | 0.72 |
| P10 | 0.58 | 1.02 | 1.31 | 0.92 | 0.92 | 1.14 | 0.82 | 0.80 | 0.72 | 0.00 |

Matrix 6, below, shows a distance value between each of the ten products, labeled P1 through P10, for the price characteristic as calculated from the price data in the exemplary Type IV data set assumed to have been previously generated for the purposes of this example.

Matrix 6

| Product | P1 | P2 | P3 | P4 | P5 | P6 | P7 | P8 | P9 | P10 |
|---|---|---|---|---|---|---|---|---|---|---|
| P1 | 0.00 | 1.00 | 1.20 | 1.00 | 1.44 | 0.52 | 1.52 | 0.28 | 0.72 | 0.80 |
| P2 | 1.00 | 0.00 | 0.56 | 0.60 | 0.88 | 1.08 | 0.04 | 0.72 | 1.36 | 0.12 |
| P3 | 1.20 | 0.56 | 0.00 | 2.12 | 0.32 | 0.92 | 1.24 | 1.52 | 2.32 | 1.04 |
| P4 | 1.00 | 0.60 | 2.12 | 0.00 | 0.32 | 0.84 | 0.68 | 0.48 | 0.28 | 0.88 |
| P5 | 1.44 | 0.88 | 0.32 | 0.32 | 0.00 | 2.32 | 0.80 | 0.16 | 0.56 | 0.64 |
| P6 | 0.52 | 1.08 | 0.92 | 0.84 | 2.32 | 0.00 | 0.04 | 0.68 | 0.60 | 0.00 |
| P7 | 0.52 | 0.04 | 1.24 | 0.68 | 0.80 | 0.04 | 0.00 | 0.16 | 0.68 | 0.08 |
| P8 | 0.28 | 0.72 | 1.52 | 0.48 | 0.16 | 0.68 | 0.16 | 0.00 | 0.48 | 0.04 |
| P9 | 0.72 | 1.36 | 2.32 | 0.28 | 0.56 | 0.60 | 0.68 | 0.48 | 0.00 | 0.84 |
| P10 | 0.80 | 0.12 | 1.04 | 0.88 | 0.64 | 0.00 | 0.08 | 0.04 | 0.84 | 0.00 |

Matrix 7, below, shows a distance value between each of the ten products, labeled P1 through P10, for the clicks characteristic as calculated from the clicks data in the exemplary Type IV data set assumed to have been previously generated for the purposes of this example.

Matrix 7

| Product | P1 | P2 | P3 | P4 | P5 | P6 | P7 | P8 | P9 | P10 |
|---|---|---|---|---|---|---|---|---|---|---|
| P1 | 0.00 | 3.43 | 5.48 | 5.58 | 2.65 | 3.09 | 4.66 | 5.18 | 1.34 | 4.45 |
| P2 | 3.43 | 0.00 | 2.70 | 3.18 | 6.85 | 2.28 | 4.42 | 4.38 | 4.43 | 3.61 |
| P3 | 5.48 | 2.70 | 0.00 | 2.75 | 3.81 | 2.04 | 2.63 | 6.51 | 2.75 | 5.38 |
| P4 | 5.58 | 3.18 | 2.75 | 0.00 | 5.94 | 4.97 | 4.17 | 4.77 | 2.65 | 3.51 |
| P5 | 2.65 | 6.85 | 3.81 | 5.94 | 0.00 | 6.81 | 1.21 | 3.62 | 5.31 | 5.54 |
| P6 | 3.09 | 2.28 | 2.04 | 4.97 | 6.81 | 0.00 | 3.05 | 2.77 | 3.34 | 4.77 |
| P7 | 4.66 | 4.42 | 2.63 | 4.17 | 1.21 | 3.05 | 0.00 | 5.74 | 0.66 | 4.04 |
| P8 | 5.18 | 4.38 | 6.51 | 4.77 | 3.62 | 2.77 | 5.74 | 0.00 | 5.32 | 4.28 |
| P9 | 1.34 | 4.43 | 2.75 | 2.65 | 5.31 | 3.34 | 0.66 | 5.32 | 0.00 | 4.94 |
| P10 | 4.45 | 3.61 | 5.38 | 3.51 | 5.54 | 4.77 | 4.04 | 4.28 | 4.94 | 0.00 |

Once a distance matrix for each of the categorical and quantitative characteristics has been determined, these matrices, namely Matrix 1 through Matrix 7, are combined into a single block diagonal matrix, Matrix 8, as shown below.

Matrix 8

$$\begin{bmatrix} \text{Matrix1} & 0 & 0 & 0 & 0 & 0 & 0 \\ 0 & \text{Matrix2} & 0 & 0 & 0 & 0 & 0 \\ 0 & 0 & \text{Matrix3} & 0 & 0 & 0 & 0 \\ 0 & 0 & 0 & \text{Matrix4} & 0 & 0 & 0 \\ 0 & 0 & 0 & 0 & \text{Matrix5} & 0 & 0 \\ 0 & 0 & 0 & 0 & 0 & \text{Matrix6} & 0 \\ 0 & 0 & 0 & 0 & 0 & 0 & \text{Matrix7} \end{bmatrix}$$

It will be appreciated that each "0" in Matrix 8 represents a 10×10 matrix of zeros. The end result is that Matrix 8 is a 70×70 matrix.

In order to determine the single distance values between each of the products, Matrix 8 is pre-multiplied by a 10×70 weighting matrix. The result of this pre-multiplication is then post-multiplied by a transpose of the weighting matrix, which is a 70×10 matrix. It will be appreciated that the 10×70 weighting matrix contains mostly zeros in each row. The first row, for example, has zeros in any entry that does not correspond to P1, and the second row has zeros in any entry that does not correspond to P2, and so on. Thus, the first ten columns for the first row of the weighting matrix would be:

[$W_{P1\ taxonomy}$ 0 0 0 0 0 0 0 0 0]

where $W_{P1\ taxonomy}$ is a weighting factor for the taxonomy of P1. The second ten columns for the first row would be:

[$W_{P1\ attribute\ existence}$ 0 0 0 0 0 0 0 0 0]

where $W_{P1\ attribute\ existence}$ is a weighting factor for the attribute existence of P1. The third ten columns for the first row would be:

[$W_{P1\ attribute\ match}$ 0 0 0 0 0 0 0 0 0]

where $W_{P1\ attribute\ match}$ is a weighting factor for the attribute match of P1. The fourth ten columns for the first row would be:

[$W_{P1\ brand}$ 0 0 0 0 0 0 0 0 0]

where $W_{P1\ brand}$ is a weighting factor for the brand of P1. The fifth ten columns for the first row would be:

[$W_{P1\ sales}$ 0 0 0 0 0 0 0 0 0]

where $W_{P1\ sales}$ is a weighting factor for the sales of P1. The sixth ten columns for the first row would be:

[$W_{P1\ price}$ 0 0 0 0 0 0 0 0 0]

where $W_{P1\ price}$ is a weighting factor for the price of P1. The seventh ten columns for the first row would be:

[$W_{P1\ clicks}$ 0 0 0 0 0 0 0 0 0]

where $W_{P1\ clicks}$ is a weighting factor for the clicks of P1. The remaining nine rows of the weighting matrix may be created following the pattern above. For example, the first ten columns of the second row would be

[0 $W_{P2\ taxonomy}$ 0 0 0 0 0 0 0 0]

where $W_{P2\ taxonomy}$ is a weighting factor for the taxonomy of P2.

The end result of pre-multiplying and post-multiplying by the weighting matrix is that the distance between any two products is determined from their respective categorical and quantitative data. For example, the distance between P1 and P3 is the P3 weight for taxonomy multiplied by the P1 weight for taxonomy multiplied by their taxonomy distance value plus the P3 weight for sales multiplied by the P1 weight for sales multiplied by their sales distance value and so on. Mathematically, the single distance value between P1 and P3 may be expressed as:

$$W_{P1\ taxonomy} \times W_{P3\ taxonomy} \times D_{1,3\ taxonomy} + \\ W_{P1\ attribute\ existence} \times W_{P3\ attribute\ existence} \times \\ D_{1,3\ attribute\ existence} + W_{P1\ attribute\ match} \times \\ W_{P3\ attribute\ match} \times D_{1,3\ attribute\ match} + W_{P1\ brand} \times \\ W_{P3\ brand} \times D_{1,3\ brand} + W_{P1\ sales} \times W_{P3\ sales} \times \\ D_{1,3\ sales} + W_{P1\ price} \times W_{P3\ price} \times D_{1,3\ price} + \\ W_{P1\ clicks} \times W_{P3\ clicks} \times D_{1,3\ clicks}$$

where W is a weighting factor and D is a distance value. The values of the weighting factors may be established such as to emphasize or de-emphasize the importance of any particular characteristic on a product-by-product basis based upon market observations. It will be observed from the above, that each distance value for a categorical or quantitative characteristic is multiplied by a weighting factor for one of the products and a weighting factor for the other product. Using a suitable weighting matrix, the exact form of which will not be disclosed herein, a final distance matrix, Matrix 9, may be calculated as shown below.

Matrix 9

| Product | P1 | P2 | P3 | P4 | P5 | P6 | P7 | P8 | P9 | P10 |
|---|---|---|---|---|---|---|---|---|---|---|
| P1 | 0.0000 | 0.1286 | 0.1988 | 0.2089 | 0.1040 | 0.1259 | 0.1758 | 0.1761 | 0.0995 | 0.1715 |
| P2 | 0.1286 | 0.0000 | 0.1218 | 0.0915 | 0.1573 | 0.1362 | 0.1530 | 0.1511 | 0.1870 | 0.1350 |
| P3 | 0.1988 | 0.1218 | 0.0000 | 0.1606 | 0.1018 | 0.1285 | 0.1436 | 0.2225 | 0.1654 | 0.1986 |
| P4 | 0.2089 | 0.0915 | 0.1606 | 0.0000 | 0.1072 | 0.1837 | 0.1572 | 0.1773 | 0.1181 | 0.1465 |
| P5 | 0.1040 | 0.1573 | 0.1018 | 0.1072 | 0.0000 | 0.2640 | 0.1140 | 0.1517 | 0.1970 | 0.1745 |
| P6 | 0.1259 | 0.1362 | 0.1285 | 0.1837 | 0.2640 | 0.0000 | 0.1520 | 0.1741 | 0.1673 | 0.2248 |
| P7 | 0.1758 | 0.1530 | 0.1436 | 0.1572 | 0.1140 | 0.1520 | 0.0000 | 0.2601 | 0.0680 | 0.1907 |
| P8 | 0.1761 | 0.1511 | 0.2225 | 0.1773 | 0.1517 | 0.1741 | 0.2601 | 0.0000 | 0.2556 | 0.1964 |
| P9 | 0.0995 | 0.1870 | 0.1654 | 0.1181 | 0.1970 | 0.1673 | 0.0680 | 0.2556 | 0.0000 | 0.2368 |
| P10 | 0.1715 | 0.1350 | 0.1986 | 0.1465 | 0.1745 | 0.2248 | 0.1907 | 0.1964 | 0.2368 | 0.0000 |

The single distance values in Matrix 9 between any two products represents the overall distance between the products based upon a combination of their respective categorical and quantitative characteristics. Using a standard clustering methodology, the ten products may be clustered as follows:

Cluster 1: P1, P6, P7, P9
Cluster 2: P2, P3, P4, P5
Cluster 3: P8, P10.

As previously explained, new products with limited historical sales information may be associated with one of the product clusters using any one of a number of known methodologies. The historical sales information for the products in the associated cluster may then be utilized to determine at least one of a price elasticity and optimal price for the product with the limited historical sales information. This now ends the discussion of Example 2.

Figure 10:
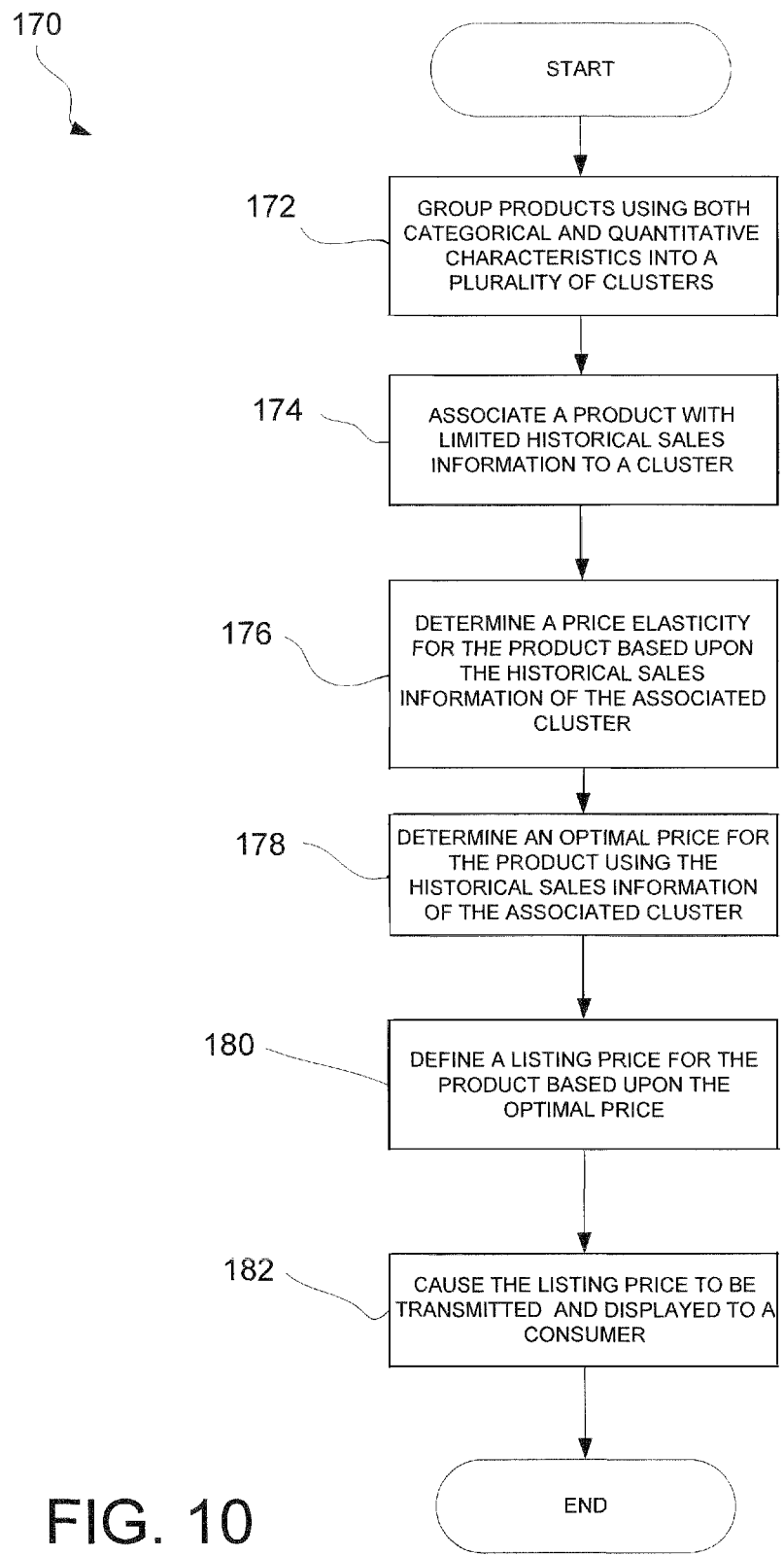
FIG. 10 is a high level flowchart of an exemplary process by which an optimal price and price elasticity for a product may be determined and implemented using a cluster of analogous products.

Referring now to FIG. 10, there is shown a flowchart 170 of a computer-implemented method of determining a price elasticity and an optimal price for a product with limited historical sales information. The method begins at step 172 where a group of products is clustered based upon both categorical and quantitative characteristics. At step 174, a product with limited historical sales data is associated with one of the clusters of products determined at step 172. At step 176, a price elasticity for the product is determined based upon the historical sales information of the products in the associated cluster. At step 178, an optimal price for the product is determined using the historical sales information of the products in the associated cluster. At step 180, a listing price for the product is defined based upon the optimal price determined in the previous step. At step 182, the listing price is transmitted over a network for display to a consumer using a remote computer.

Referring now back to FIGS. 1 and 3, as previously discussed, the price optimization module 34 may include a net profit maximization module 70, a revenue maximization module 72, and a quantity maximization module 74, each of which is able to determine an optimal price for a product based upon a mutually exclusive business objective. Often, an operator of the e-commerce system 2 may want to evaluate two or more different pricing scenarios for a product by comparing the different optimal prices generated by two or more of the modules 70, 72 and 74. In order to facilitate the selection of one of the different pricing scenarios, the product pricing device 8 may further comprise a scenario evaluation module 40.

In an embodiment of the present disclosure, the scenario evaluation module 40 is operable to present relevant market information to an operator of the e-commerce system 2 to thereby facilitate the selection of one of the pricing scenarios. The market information may be output to the user on an output device. The market information provided by the scenario evaluation module 40 may include loyalty information regarding the likely purchasers of a product. In particular, the loyalty information may indicate whether a product is more likely to be purchased by repeat customers of the e-commerce system 2 or non-repeat customers. This information may be mined from the warehouse database 24.

Where it is determined that the likely purchasers of the product are repeat customers, the operator may input, using an input device, a selection of the scenario with the lowest price to thereby generate increased customer loyalty and repeat business. Where it is determined that a product is more likely to be purchased by non-repeat customers, then the operator may elect the scenario with the highest price since ongoing customer loyalty is not a factor with the likely purchasers of the product. The market information presented to an operator may further include information on the competitive environment surrounding a product. For example, if it is known that limited quantities of a product are available in the marketplace, then the operator may input a selection that chooses the scenario with the highest price.

Figure 11:
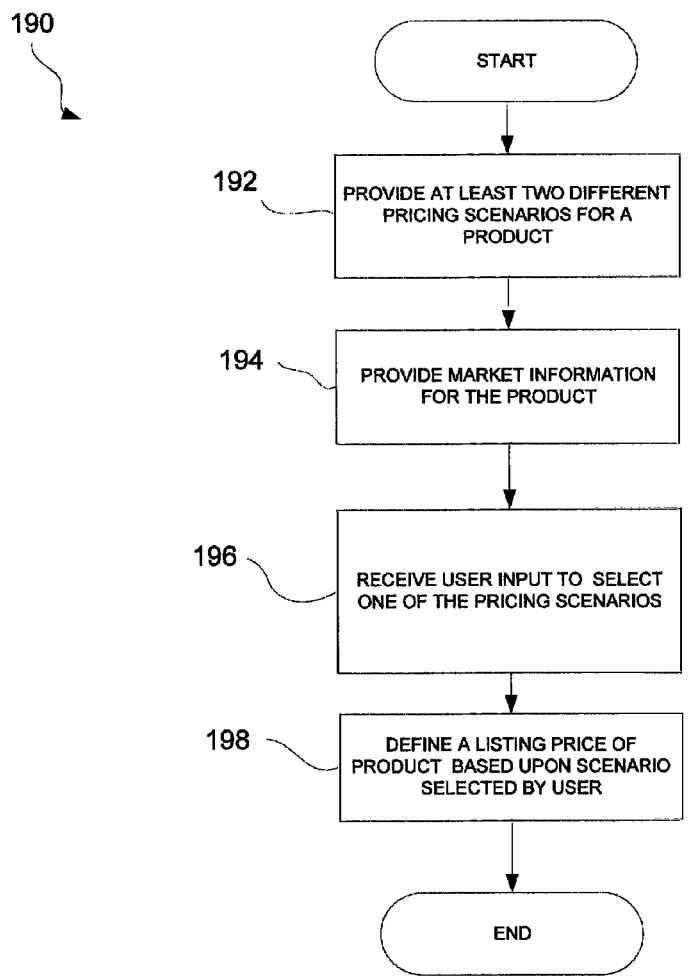
FIG. 11 is a high level flowchart of an exemplary process by which a user may select between a plurality of pricing scenarios based upon market information.

Referring now to FIG. 11, there is shown a flowchart 190 of a computer-implemented method for allowing a user to evaluate and select between different pricing scenarios. At step 192, two or more different pricing scenarios for a product are provided to the user. This may include retrieving the different pricing scenarios from a storage medium. This may further include performing one or more price optimization calculations to determine the different pricing scenarios for the product. This may further include displaying the different pricing scenarios on a computer display. At step 194, market information related to the product is provided. At step 196, user input is received that selects one of the different pricing scenarios based upon the market information. At step 198, the listing price of the product is defined based upon the pricing scenario selected at step 196.

Figure 12:
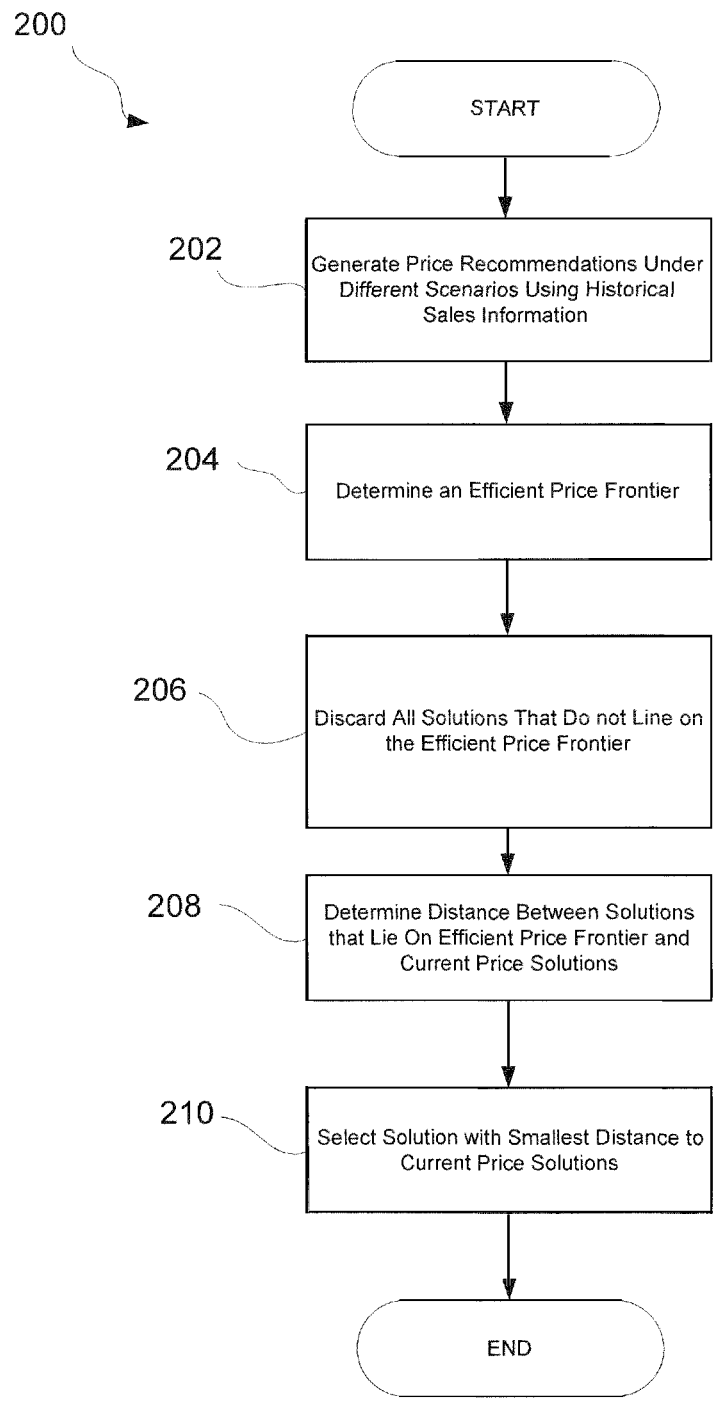
FIG. 12 is a high level flowchart of an exemplary process by which a user may select between a plurality of pricing scenarios based upon market information.
Figure 13:
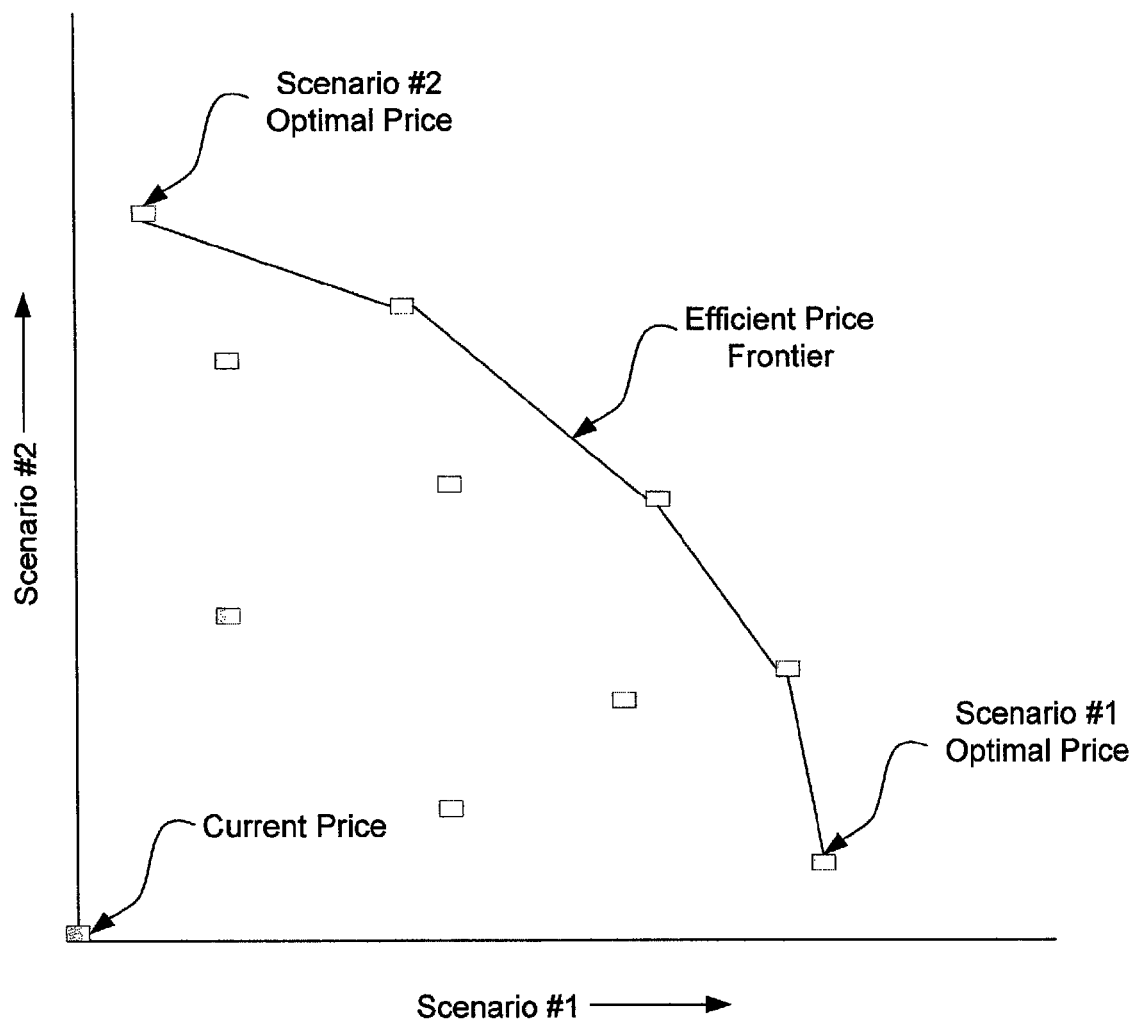
FIG. 13 is a graph illustrating an efficient price frontier between two optimal prices generated by different pricing scenarios

Referring now to FIG. 12, there is shown a flowchart 200 of another computer-implemented method for allowing a user to evaluate and select between different pricing scenarios. At step 202, optimal prices for different pricing scenarios are generated using different setting for optimization criteria and different settings for optimization constraints, i.e., different threshold values for min/max price change percentages, min/max net profit percentages, min/max price, and min/max quantity sold. These optimal prices may be displayed on a graph such as the one shown in FIG. 13. At step 204, an efficient price frontier is determined from the results of step 202 by mapping the expected outcomes of the pricing optimization scenarios. The efficient price frontier may be displayed on a graph such as the one shown in FIG. 13. The efficient price frontier shown on the graph in FIG. 13 is a concave envelope on the price optimization mappings.

Next, at step 206, all of the solutions that do not lie on the efficient price frontier are discarded from further consideration. It will be appreciated that the scenarios that lie on the efficient price frontier are efficient solutions. The scenarios that do not lie on the efficient frontier are less desirable, and are discarded. At step 208, for the solutions that lie on the efficient price frontier, the distance between each of them and the current price solutions are computed. The distance between two solutions indicates how close they are to each other. When changing prices for a set of products, it is desirable to minimize the overall distance between the new prices and the old prices to ensure that the uncertainty associated with changing prices is minimized. At step 210, the solution on the efficient price frontier with the smallest distance to the current price solutions is selected.

A suitable distance matrix for step 208, above, may be defined using the following notation:

| | |
|---|---|
| I | Vector of all products |
| i | Index for products in Vector I |
| J | Set of all price recommendation scenarios |
| j | Index for a price recommendation scenario |
| cp | Current price vector |
| $cp_i$ | Current price for product i ($i^{th}$ element in the vector cp) |
| $rp^j$ | Vector of all price recommendations in scenario j |
| $rp^j_i$ | Price recommendation for product i, in price recommendation scenario j |
| $d^j$ | Distance between solutions j and current solution |

The distance matrix between product prices under scenario j and current product prices may then be defined as:

$$d_i^j = 1 \text{ if } cp_i = rp_i^j, \text{ otherwise } 0 \qquad \text{Eq. (7)}$$

$$d^j = \sum_{i \in I} d_i^j \qquad \text{Eq. (8)}$$

The distance matrix is evaluated for each of the scenarios, and the solution with the smallest distance is selected for execution.

Referring back to FIG. 1, the modules disclosed herein in relation to the e-commerce system 2 may comprise at least one processor and a memory having a program product stored therein. Thus, it will be appreciated that the devices 4, 6, and 8 disclosed herein may comprise a single computer, two or more computers, or a cluster of computers. It will therefore be appreciated that the modules disclosed herein may be implemented on a single computer or a plurality of computers.

Indeed, many of the functional units described in this specification have been labeled herein as "modules," in order to more particularly emphasize their implementation independence. For example, a module may comprise a hardware circuit comprising custom VLSI circuits or gate arrays, off-the-shelf semiconductors such as logic chips, transistors, or other discrete components. A module may comprise any programmable hardware devices such as field programmable gate arrays, programmable array logic, programmable logic devices or the like.

Modules may also comprise a program product stored in a memory for execution by various types of processing units. An identified program product may, for instance, comprise one or more physical or logical blocks of computer instructions that may, for instance, be organized as an object, procedure, or function. Nevertheless, the instructions of a program product of an identified module need not be physically located in one location, but may comprise disparate instructions stored in different locations which, when joined logically together, comprise the program product and achieve the stated purpose for the module. A program product may be embodied in a computer-readable medium or in a memory of a computer.

Figure 15:
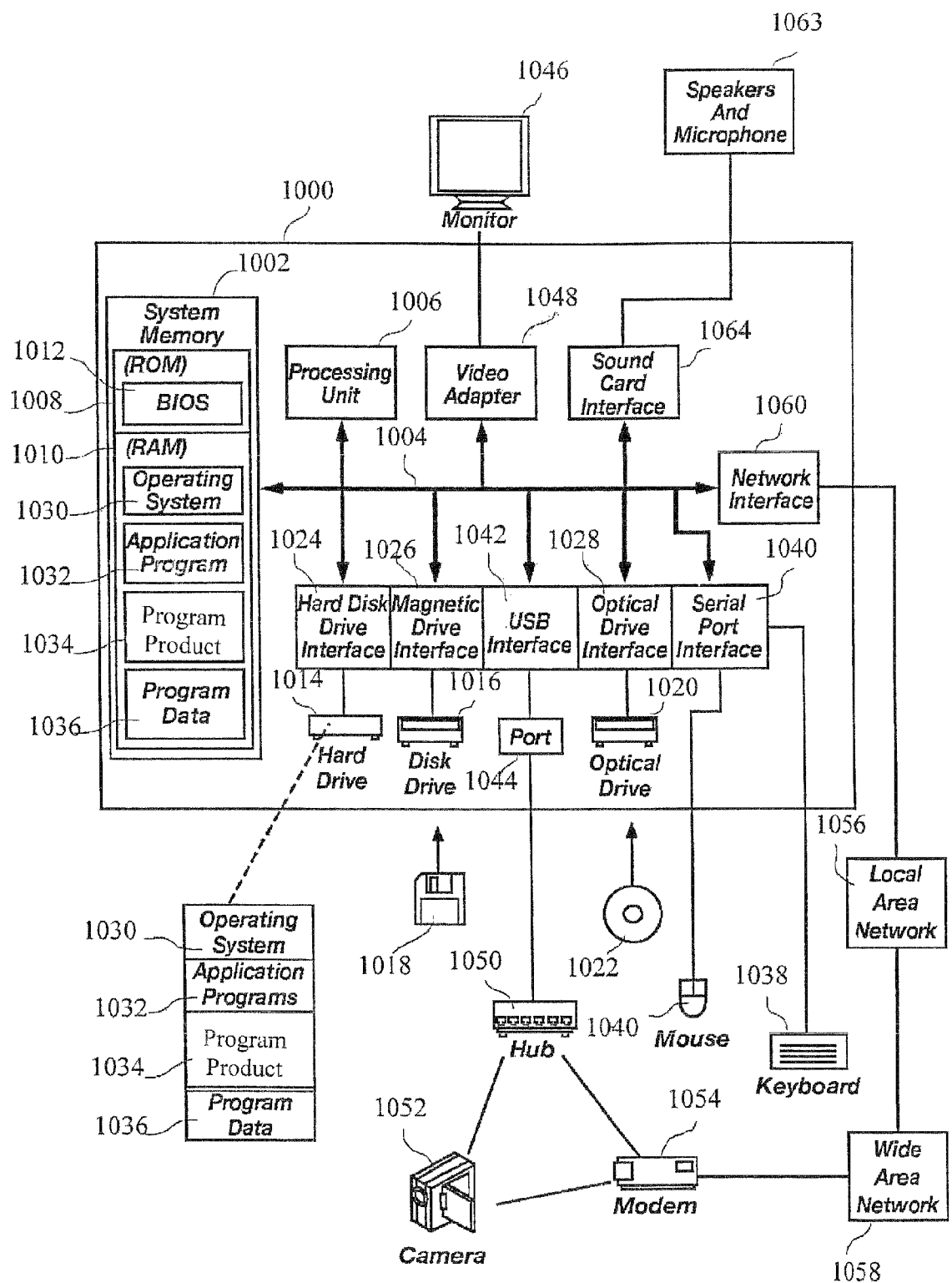
FIG. 15 is a diagram of an exemplary module architecture suitable for use with the modules of the present disclosure.

Referring now to FIG. 15, there is shown an exemplary embodiment of a computing device 1000, that may be used for the implementing one or more of the modules of the present disclosure, namely, the modules 12, 18, 22, 32, 34, 36, 38, 40 and 42 shown in FIG. 1, and the modules 70, 72, 74 and 76 as shown in FIG. 3, and the modules 144, 146, 148 and 149 as shown in FIG. 8. It will be appreciated that the device 1000 may have more or fewer features than shown in FIG. 15 as the individual circumstances require. Further, the device 1000 shown in FIG. 15 may have various forms, including a dedicated computer, a server, a desktop PC, a laptop or a portable tablet form, or a hand held form. The features shown in FIG. 15 may be integrated or separable from the device 1000. For example, while a monitor 1046 is shown in FIG. 15 as being separate, it may be integrated into the device 1000, such as the case of a laptop or tablet type computer.

The device 1000 may include a system memory 1002, and a system bus 1004 that interconnects various system components including the system memory 1002 to a processing unit 1006. The processing unit 1006 may comprise one processor or an array of processors. The processing unit 1006 may be able to engage in parallel processing.

The system bus 1004 may be any of several types of bus structures including a memory bus or memory controller, a peripheral bus, and a local bus using any of a variety of bus architectures as is known to those skilled in the relevant art. The system memory may include read only memory (ROM) 1008 and random access memory (RAM) 1010. A basic input/output system (BIOS) 1012, containing the basic routines that help to transfer information between elements within the device 1000, such as during start-up, is stored in ROM 1008.

The device 1000 may further include a hard disk drive 1014 for reading and writing information to a hard disk (not shown), a magnetic disk drive 1016 for reading from or writing to a removable magnetic disk 1018, and an optical disk drive 1020 for reading from or writing to a removable optical disk 1022 such as a CD ROM, DVD, or other optical media. It will be appreciated that the hard disk drive 1014, magnetic disk drive 1016, and optical disk drive 1020 may be connected to the system bus 1004 by a hard disk drive interface 1024, a magnetic disk drive interface 1026, and an optical disk drive interface 1028, respectively. The drives and their associated computer-readable media provide nonvolatile storage of computer readable instructions, data structures, program modules and other data for the device 1000. Although the exemplary environment described herein employs a hard disk, a removable magnetic disk 1018, and a removable optical disk 1022, it will be appreciated by those skilled in the relevant art that other types of computer readable media which can store data that is accessible by a computer, such as magnetic cassettes, flash memory cards, digital video disks, Bernoulli cartridges, random access memories, read only memories, and the like may also be used in the exemplary operating environment. The hard disk drive 1014 may store databases and data sets. For example, the hard disk drive 1014 may store one or more of the live database 20, the warehouse database 24, and the analytics database 26 shown in FIG. 1.

A number of programs may be stored on the hard disk 1014, magnetic disk 1018, optical disk 1022, ROM 1008 or RAM 1010, including an operating system 1030, one or more applications programs 1032, program product 1034, and program data 1036. It will be appreciated that the program product 1034 may comprise one or more set of computer-readable instructions for the modules of the e-commerce system 2 as disclosed herein.

A user may enter commands and information into the device 1000 through input devices such as a keyboard 1038 and a pointing device 1040, such as a mouse. These and other input devices are often connected to the processing unit 1006 through a serial port interface 1040 that is coupled to the system bus 1004. Increasingly, such input devices are being connected by the next generation of interfaces, such as a universal serial bus (USB) interface 1042 with a USB port 1044, and to which other hubs and devices may be connected. These different type of input devices may be suitable as the input device for the e-commerce system 2.

An output device 1046, such as a computer monitor or other type of display device, is also connected to the system bus 1004 via an interface, such as a video adapter 1048. The output device 1046 may be suitable for use as the output device of the e-commerce system 2. In addition to the output device 1046, the device 1000 may include other peripheral output or input devices. For example, an ultra slim XGA touch panel may be used. A resistive finger touch screen may also be used.

A USB hub 1500 is shown connected to the USB port 1044. The hub 1050 may in turn be connected to other devices such as a digital camera 1052 and modem 1054. Although not shown, it is well understood by those having the relevant skill in the art that a keyboard, scanner, printer, external drives (e.g., hard, disk and optical) and a pointing device may be connected to the USB port 1044 or the hub 1050. Thus, it should be understood that additional cameras and devices may be directly connected to the computer through the USB port 1044. Thus, the system depicted is capable of communicating with a network and sending/receiving audio, video and data.

The device 1000 may operate in a networked environment using logical connections to one or more remote computers. The types of connections between networked devices include dial up modems, e.g., modem 1054 may be directly used to connect to another modem, ISDN, DSL, cable modems, wireless and include connections spanning users connected to the Internet. The remote computer may be another personal computer, a server, a router, a network PC, a peer device or other common network node, and typically includes many or all of the elements described above relative to the device 1000 in FIG. 15. The logical connections depicted in FIG. 15 include a local area network (LAN) 1056 and a wide area network (WAN) 1058. Such networking environments are commonplace in offices, enterprise-wide computer networks, intranets and the Internet.

When used in a LAN networking environment, the device 1000 is connected to the local network 1056 through a network interface or adapter 1060. The device 1000 may also connect to the LAN via through any wireless communication standard, such as the 802.11 wireless standard. When used in a WAN networking environment, the device 1000 typically uses modem 1054 or other means for establishing communications over the wide area network 1058. It should be noted that modem 1054 may be internal or external and is connected to the system bus 1004 through USB port 1044. A modem may optionally be connected to system bus 1004 through the serial port interface 1040. It will be appreciated that the network connections shown are exemplary and other means of establishing a communications link between the computers may be used, e.g., from a LAN gateway to WAN.

The device 1000 may also receive audio input from a microphone and output audio sounds through speakers as illustratively shown by the box marked with the reference numeral 1062 in FIG. 15. A sound card interface 1064 processes the sounds to a sound card and the system bus 1064. Further, the device 1000 may take many forms as is known to those having relevant skill in the art, including a desk top personal computer, a lap top computer, a hand held computer, and the like. Further, the computer compatibility of the device 1000 may include, without limitation, IBM PC/XT/AT, or compatibles, or Apple Macintosh.

Generally, the processing unit 1006 of the device 1000 are programmed by means of instructions stored at different times in the various computer-readable storage media of the computer. Programs, operating systems and program products are typically distributed, on computer-readable mediums, for example, on floppy disks or CD-ROMs. From there, they are installed or loaded into the secondary memory of a computer. At execution, they are loaded at least partially into the system memory 1002. The disclosure described herein includes these and other various types of computer-readable storage media when such media contain instructions or programs for implementing the steps described herein in conjunction with a microprocessor or other data processor. In an embodiment of the present disclosure, the remote computer 14, consumer interface device 4, data management device 6, and product pricing device 8 depicted in FIG. 1 may also take the general form of the device 1000.

It will be appreciated that one or more devices 1000 forming the web server module 12 may be referred to herein as a "computer" or a "web server." Likewise, one or more devices 1000 implementing the database server module 12 or the warehouse server module 22 may be referred to herein as a "computer" or a "database management device." And, one or more devices 1000 implementing one or more of the measurement module 32, the price optimization module 34, the price implementation module 36, the product clustering module 38, the scenario optimization module 40, the clicks prediction module 42, the net profit maximization module 70, the revenue maximization module 72, the quantity maximization module 74, and the elasticity calculation module 76, may be referred to herein as a "computer" or "product pricing device." It will be further appreciated that an embodiment of the present disclosure may comprise one or more web servers, one or more database management devices, and one or more product pricing devices. The remote device 14 may also be implemented by a computing device having the general form of the device 1000.

An embodiment of the present disclosure may include a computer system for optimizing a price of a product comprising: (a) at least one processing unit and at least one memory unit; and (b) a first set of computer-readable instructions stored in the at least one memory unit for causing the at least one processing unit to: (i) generate optimal prices for different scenarios, (ii) determine an efficient price frontier for the optimal prices, (iii) determine distances between solutions that lie on the efficient price frontier and current price solutions, or (iv) determine a solution on the efficient price frontier closest to the current price solutions.

An embodiment of the present disclosure may include a computer-implemented method for optimizing a price of a product comprising: (a) maintaining a database of historical sales information for a product in a data storage; (b) loading a subset of the historical sales information from the database into a memory of a product pricing device; (c) defining optimal prices for different business scenarios using the historical sales information for the product using the product pricing device; (d) determining an efficient price frontier for the optimal prices using the product pricing device; (e) determining distances between solutions that lie on the efficient price frontier and current price solution using the product pricing device; (f) determining a solution on the efficient price frontier closest to the current price solution using the product pricing device; or (g) implementing the solution by defining a listing price of the product in a database based upon the solution.

An embodiment of the present disclosure may include a computer system for optimizing a price of a product comprising: (a) a means for generating optimal prices for different scenarios using historical sales information for a product; (b) a means for determining an efficient price frontier for the optimal prices; (c) a means for determining distances between solutions that reside on the efficient price frontier and current price solution; or (d) a means for determining a solution on the efficient price frontier closest to the current price solution.

An embodiment of the present disclosure may include a computer system for optimizing a price of a product comprising: (a) at least one processing unit and at least one memory unit; (b) a data storage having historical clicks information stored therein; and (c) a first set of computer-readable instructions stored in the at least one memory unit for causing the at least one processing unit to (i) predict future clicks based upon the historical clicks information, or (ii) use the predicted future clicks as a proxy for having a forward-looking promotions schedule in relation to a price optimization for a product.

An embodiment of the present disclosure may include a computer-implemented method for optimizing a price of a product comprising: (a) maintaining a database of historical clicks information for a product webpage in a data storage; (b) loading a subset of the historical clicks information from the database into a memory associated with a product pricing device; (c) performing an analysis on the historical clicks information using the product pricing device to thereby predict future clicks on the product webpage; or (d) defining an optimal price for the product with the product pricing device by using the predicted future clicks as a proxy for having a forward-looking promotions schedule.

An embodiment of the present disclosure may include a computer system for optimizing a price of a product comprising: (a) a means for maintaining a database of historical clicks information for a product webpage; (b) a means for performing an analysis on the historical clicks information to thereby predict future clicks on the product webpage; or (c) a means for defining an optimal price for the product by using the predicted future clicks as a proxy for having a forward-looking promotions schedule.

An embodiment of the present disclosure may include a computer system for optimizing a price of a product comprising: (a) at least one processing unit and at least one memory unit; (b) a data storage having historical clicks information stored therein; and (c) a first set of computer-readable instructions stored in the at least one memory unit for causing the at least one processing unit to (i) determine a baseline clicks amount for a given time period, (ii) determine time intervals within the given time period with click spikes above the baseline clicks amount, or (iii) eliminate past promotional effects from a predictive model based upon the click spikes.

An embodiment of the present disclosure may include a computer-implemented method for optimizing a price of a product comprising: (a) maintaining a database of historical clicks information for a product webpage in a data storage; (b) loading a subset of the historical clicks information from the database into a memory associated with a product pricing device; (c) performing an analysis on the historical clicks information using the product pricing device to thereby determine a clicks baseline for a given time period; (d) determining click spike information for time intervals within the given time period that have click spikes above the clicks baseline using the product pricing device; (e) eliminating past promotional uplifts from a predictive model based upon the click spike information using the product pricing device; or (f) optimizing a price of the product using the predictive model.

An embodiment of the present disclosure may include a computer system for optimizing a price of a product comprising: (a) a means for maintaining a database of historical clicks information for a product webpage; (b) a means for performing an analysis on the historical clicks information to thereby determine a clicks baseline for a given time period; (c) a means for determining click spike information for time intervals within the given time period that have click spikes above the clicks baseline using the product pricing device; or (d) a means for eliminating past promotional uplifts from a predictive model based upon the click spike information using the product pricing device.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A computer system for optimizing a price of a product, the system comprising:

at least one processing unit and at least one memory unit;

a first set of computer-readable instructions stored in the at least one memory unit for causing the at least one processing unit to define an optimal price for said product in satisfaction of a first constraint and a second constraint, said first constraint requiring that a quantity of the product predicted to be sold during a first time interval be less than an inventory of the product and said second constraint requiring that a quantity of product predicted to be sold by an end of a second time interval exhaust the inventory of the product;

wherein the first set computer-readable instructions stored in the at least one memory unit cause the at least one processing unit to define the optimal price by:

$$Pr(y_{it} = 1) = \frac{I(i \in A)\exp(V_{it})}{\left(1 + \sum_{j=1}^{B} I(i \in A)\exp(V_{jt})\right)}$$

where:

$$V_{it} = \beta_{0it} + \beta_1 p_{i,t-1} + \beta_2 d_{i,t-1} + p_{i,t}(\beta_3 + \beta_4 s_t) + d_{i,t}(\beta_5 + \beta_6 s_t)$$

where:

$$q_{it} = I(i \in A)Q^M Pr(y_{it}=1)$$

where:

$$\sum_{t=1}^{x} q_{it} \leq I_i$$

where:

$$\sum_{t=1}^{y} q_{it} \geq I_i$$

and where:

$q_{it}$ is a quantity of item i period t,
A is a set of SKUs in the choice set,
B is a cardinality of set A,
$I_i$ is an inventory of product i,
T is a number of periods over which to optimize,
t is an index for time periods,
$s_t$ is a seasonality for period t,
$p_{it}$ is a price of item i in period t,
$d_{it}$ is a deal percentage of item i in period t,
$Q^M$ is expected traffic, and
$\beta_x$, $\beta_{xy}$, $\beta_{xyz}$ are constants in a regression model.

2. The computer system as defined in claim 1, further comprising a second set of computer-readable instructions stored in the at least one memory unit for causing the at least one processing unit to define a listing price of the product in a database based upon said optimal price.

3. The computer system as defined in claim 2, further comprising a web server for causing the listing price of the product to be transmitted to a remote computer over a network in response to a request.

4. The computer system as defined in claim 3, wherein said web server is further operable to receive a request to purchase the product at the listing price.

5. The computer system as defined in claim 1, further comprising:

a database server for generating at least one data set comprising demand data from a database; and a second set of computer-readable instructions stored in the at least one memory unit for causing the at least one processing unit to determine at least one parameter from said demand data;

wherein said optimal price is defined by the at least one processing unit using said at least one parameter.

* * * * *